(12) United States Patent
Kimura et al.

(10) Patent No.: US 7,164,522 B2
(45) Date of Patent: Jan. 16, 2007

(54) SPATIAL LIGHT MODULATOR, SPATIAL LIGHT MODULATOR ARRAY, AND EXPOSURE APPARATUS

(75) Inventors: Koichi Kimura, Kanagawa (JP); Katsuto Sumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 60 days.

(21) Appl. No.: 10/946,099

(22) Filed: Sep. 22, 2004

(65) Prior Publication Data
US 2005/0117196 A1 Jun. 2, 2005

(30) Foreign Application Priority Data
Sep. 22, 2003 (JP) ............... P.2003-330508

(51) Int. Cl.
G02B 26/00 (2006.01)
G02B 26/08 (2006.01)
G09G 3/34 (2006.01)

(52) U.S. Cl. .............. 359/290; 359/225; 359/295; 345/85

(58) Field of Classification Search ........... 359/214, 359/224, 225, 290–292, 295, 298, 849; 345/84, 345/85
See application file for complete search history.

(56) References Cited

U.S. PATENT DOCUMENTS
6,778,304 B1 * 8/2004 Muller ............... 359/199

FOREIGN PATENT DOCUMENTS
JP 8-334709 A 12/1996
JP 2001-242395 A 9/2001

* cited by examiner

Primary Examiner—Ricky Mack
Assistant Examiner—William Choi
(74) Attorney, Agent, or Firm—Sughrue Mion, PLLC

(57) ABSTRACT

A spatial light modulator has a substrate; a movable member which is disposed so as to hang across the substrate in a displaceable manner and has a conductive section provided in at least a portion of the movable member; an optical function film which follows mechanical displacement of the movable member and is fixed to the same; and a drive fixed electrode which is disposed outside a range of mechanical displacement of the movable member and displaces and drives the movable member. Electrostatic attractive force is generated between the movable member and the driving fixed electrode by applying a drive voltage between the conductive section of the movable member and the driving fixed electrode, thereby displacing and driving the movable member, bringing the same into a stationary state in a non-contacting manner, and modulating light radiated on the optical function film.

26 Claims, 31 Drawing Sheets

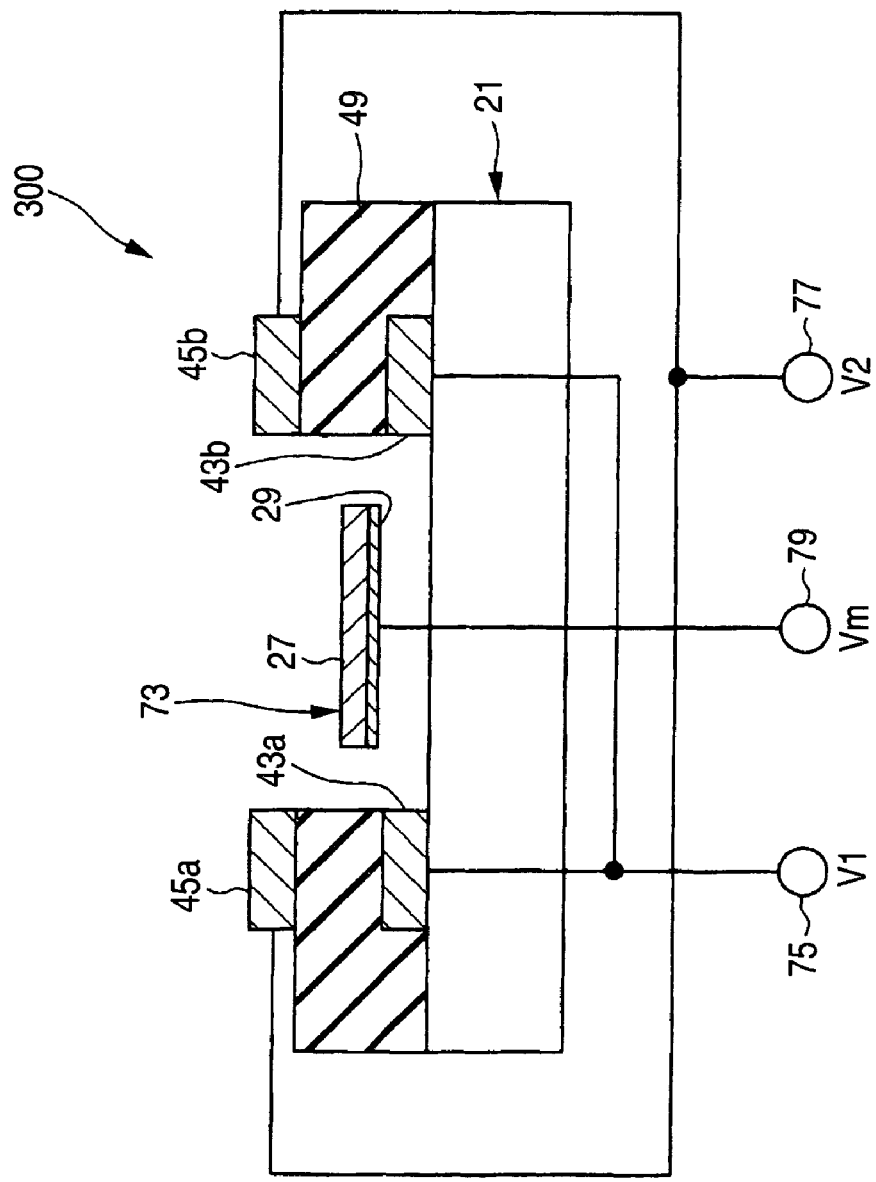

SPATIAL LIGHT MODULATOR, SPATIAL LIGHT MODULATOR ARRAY, AND EXPOSURE APPARATUS

BACKGROUND OF THE INVENTION

1. Field of the Invention

The present invention relates to a spatial light modulator, a spatial light modulator array, and an exposure apparatus using them.

2. Description of the Related Art

A spatial light modulator (SLM) is a device for forming an optical image corresponding to an electrical or optical input. One type of SLM is a digital micromirror device (DMD) in which a micromirror is fabricated by means of a micro-mechanics technique and which attempts to deflect light by tilting the micromirror. The DMD is a monolithic single chip integrated circuit SLM and is constituted of a high-density array of movable micromirrors, each of which measures, e.g., 16 microns square. These mirrors are formed on an address circuit, thereby forming a pixel of the DMD array. When set at one of two positions the mirrors reflect incident light toward a projection lens, and when set at the other position deflect the incident light toward a light absorber. The projection lens forms an image by means of focusing modulated light on a display screen.

The spatial light modulator described in JP-A-8-334709 has a rectangular mirror which is supported and raised upward on a yoke by means of a support post. The support post extends downward from the center of the mirror and is mounted to the center of the yoke along a torsion axis of the torsional post, thereby striking a balance of the mass of the mirror on the yoke. In this spatial light modulator, when a voltage is applied between the mirror and an overhead address electrode and between the yoke and a lower address electrode, the mirror is rotated by means of electrostatic force developing between the mirror and the overhead address electrode, and the yoke is rotated by means of electrostatic force developing between the yoke and the lower address electrode. One of landing pieces of the yoke lands on the lower address electrode and is supplied with the voltage, thereby enabling free side-to-side rotation.

However, since the landing piece of the yoke comes into contact with the lower address electrode, there arises van der Waals force or adhesion of the landing piece to the address electrode by means of impurities or an organic-based gas in the environment, thereby resulting in a problem of a decrease in the reliability of an element.

In order to solve such a problem, as shown in FIG. 37, a spatial light modulator 1 described in JP-A-2001-242395 comprises a mirror 7 attached to a yoke 5 by means of a mirror support post 3; mirror address electrodes 9; and yoke address electrodes 11. Trap electrodes 13 are newly added to the same locations where the mirror address electrodes 9 are formed. During the course of operation, the mirror 7 is rotated by means of attractive force stemming from electrostatic force developing between the mirror 7 and the mirror address electrode 9 and between the yoke 5 and the yoke address electrode 11. The mirror comes to a stop at a desired angle by means of development of strong attractive electrostatic force between the edge of the yoke 5 and the added trap electrode 13.

FIG. 38 is a perspective view of an end-coupled DMD structure in which the mirror 7 is drawn in perspective. This drawing also shows a torsion hinge 15, which shows a situation where the attractive force acting on the (left-side) lower edge of the rotating mirror 7 is greater than the attractive force acting on the (right-side) upper edge of the rotating mirror 17. Here, the yoke 5 and the left-side trap electrode 13 in the drawing are in extreme proximity to each other. The attractive force corresponds to a function of electrostatic capacity and distance, both existing between the edge of the yoke 5 and the edge of the trap electrode 13. This function is highly dependent on the area on the end face of the yoke 5, the area of the end face of the trap electrode 13, and a distance between the respective end faces. This distance is expressed as $f=1/d^2$, in the manner of a second-order function. By means of this configuration, the mirror 7 rotates along an orthogonal axis situated in the overall edge of the mirror 7 or the yoke 5 which is adjacent to and located very close to the trap electrode 13.

Accordingly, in this DMD structure, the trap electrode 13 is provided so as to come into proximity to the continuous edge of the mirror 7 or the yoke 5 when the mirror 7 is rotated to an appropriate height above the surface of the element and a domain of a desired angle. Hence, extremely strong electrostatic attractive force develops between the trap electrode 13 and the mirror assembly. When the mirror 7 has come close to the plane of the trap electrode 13, the mirror 7 is biased so as to come to a stop. As a result, the mirror 7 is attenuated without fail by means of adjusting the pulse waveform of the mirror assembly, whereby the mirror assembly is stopped after having moved through a desired rotational angle.

In the light deflector described in Dual-Mode Micromirrors for Optically-Phased Array Applications TRANSDUCERS 01 EUROSENSORS XV [The 11$^{th}$ International Conference on Solid-Sensors and Actuators (2001)], a mirror is fixed to the center of a pivotal shaft, and orthogonal support shafts are fixed to both ends of the pivotal axis. A so-called comb drive, which is drive means, is provided on the respective ends of the support shafts. In the comb drive, a comb-shaped upper electrode plate and a comb-shaped lower electrode are oriented while being fitted together. Both ends of the respective support shafts are vertically actuated by means of electrostatic force acting on the mutually-opposing electrodes. Consequently, the pivotal shaft is rotated, to thus enable free side-to-side rotation of the mirror.

However, the spatial light modulator described in JP-A-2001-242395 has a yoke and a mirror, which are provided on a torsion hinge in a two-stage structure. As a result, the overall mass of the movable section is increased, thereby posing a limitation on high-speed movement. The address electrodes and the yoke are disposed in the same plane, so that the areas of the respective electrodes become smaller. As a result, the electrostatic attractive force acting on the pixel mirror and the address electrodes and the electrostatic attractive force acting on the yoke and the address electrodes become smaller, thus posing a limitation on the tendency toward lower voltage and higher-speed driving.

Further, since a single trap electrode operates only the edge, there arises an inconvenience of a reduction in a range of action of an electric field to be trapped.

Moreover, in addition to the complicated structure of the comb drive, the light deflector described in Dual-Mode Micromirrors for Optically-Phased Array Applications TRANSDUCERS 01 EUROSENSORS XV [The 11$^{th}$ International Conference on Solid-Sensors and Actuators (2001)] requires four comb drives. Hence, the footprint of the comb drive structure becomes larger, thereby posing difficulty in attaining miniaturization and an increase in resolution and a problem of a low utilization factor of light.

SUMMARY OF THE INVENTION

The present invention has been conceived in view of the circumstances and aims at providing a spatial light modulator and a spatial light modulator array, which enable non-contact displacement of a light reflector and high-speed driving with a low voltage and facilitate miniaturization and enhancement of resolution, as well as providing an exposure apparatus using them.

To achieve the object, according to a first aspect of the present invention, there is provided a spatial light modulator comprising: a substrate; a movable member provided above the substrate so as to hang across the substrate in a displaceable manner, wherein at least a portion of the movable member is a conductive section; an optical functional film that follows displacement of the movable member, the optical functional film being fixed to the movable member, wherein the optical functional film may be formed integrally with or separately from the movable member; and a fixed drive electrode disposed outside a range of rotational path within which mechanical displacement of the movable member becomes feasible, so as to cause displacement and driving of the movable member, wherein electrostatic attracting force is exerted between the movable member and the fixed drive electrode by a drive voltage application to at least one of the conductive section of said movable member and the fixed drive electrode, and the movable member is actuated and displaced with respect to the fixed drive electrode while maintaining the movable member in a non-contact state and then brought to a standstill, so as to modulate light radiated on the optical function film.

In this spatial light modulator, the movable member is formed from a displaceable beam having an optical function film and a conductive section. The fixed drive electrode is disposed outside a range of rotational path within which mechanical displacement of the movable member becomes feasible; that is, outside a range of displacement path in which structural displacement can be made possible not by controlling a drive voltage but by external force. As a result, electrostatic attracting force is exerted between the movable member and the fixed drive electrode, by means of applying a drive voltage to the conductive section of the movable member and the fixed drive electrode, and the movable member is actuated and displaced toward the fixed drive electrode in a non-contacting manner and can be brought to a standstill. Thereby, the light radiated on the optical function film can be modulated. As mentioned above, non-contact displacement of the optical function film becomes feasible. Moment of inertia is made smaller by reducing the overall mass of the movable section, thereby enabling high-speed driving at a low voltage.

Moreover, the optical function film can be displaced without bringing the movable member and the fixed drive electrode into contact with each other, thereby preventing fastening of the movable member to the fixed drive electrode and enhancing the reliability of the element.

In contrast with the related-art element having a so-called comb drive structure, the spatial light modulator of the present invention is simple in structure. Hence, miniaturization of the spatial light modulator is facilitated, and realization of a one-dimensional array or a two-dimensional array becomes easy. In addition, the footprint of the drive structure also becomes smaller (i.e., light is not obstructed by an area where a drive structure is formed), thereby enhancing a utilization factor of light and facilitating enhancement of a resolution.

According to a second aspect of the present invention, there is provided a spatial light modulator as set forth in the first aspect of the invention, wherein the movable member further comprises a beam, the beam being provided above the substrate so as to hang across the substrate, wherein the optical function film can be rotationally displaced by torsion of the beam; and wherein the fixed drive electrode is disposed outside of a range of rotational path of the movable member defined by the torsion of the beam, and the optical function film is pivotally displaced by the drive voltage application.

In this spatial light modulator, the movable member is formed from a beam which has a light reflector and a conductive section and can be twisted. Accordingly, the overall mass of the movable section and the moment of inertia are reduced, thereby enabling high-speed driving at a low voltage.

According to a third aspect of the present invention, there is provided a spatial light modulator as set forth in the second aspect of the invention, wherein the fixed drive electrode is disposed on both sides of the beam so that the beam is a center.

In this spatial light modulator, the position of the fixed drive electrode disposed outside the range of rotational path of the movable member is set on both sides of the beam. Thus, since the fixed electrode is disposed on both sides of the beam, electrostatic attractive force required to pivot the movable member in a non-contacting manner can be made optimally.

According to a fourth aspect of the present invention, there is provided a spatial light modulator as set forth in the second or third aspect of the invention, wherein the fixed drive electrode has a lower electrode disposed closer to the substrate, with reference to a non-drive position of the beam; and an upper electrode disposed further from the substrate, with reference to the non-drive position.

In this spatial light modulator, each of the fixed drive electrodes provided on the respective sides of the beat has an electrode which is lower then a non-drive position of the beam; and an electrode which is higher than the non-drive position. Specifically, a total of four electrodes are disposed around the beam; namely, two electrodes which are lower than the beam with the beam located therebetween and two electrodes which are higher than the beam with the beam located therebetween. More specifically, the torsional center of the beam is located at a point of intersection between a diagonal line interconnecting the upper left electrode and the lower right electrode and a diagonal line interconnecting the lower left electrode to the upper right electrode. Accordingly, the electrodes for effectively imparting electrostatic force around the torsional center of the movable member—which is pivotally actuated around a single axis—an be disposed in a void-saving manner.

According to a fifth aspect of the present invention, there is provided a spatial light modulator as set forth in the fourth aspect of the invention, wherein the lower electrode comprises a first lower electrode and a second lower electrode, the first and second lower electrodes being provided on respective sides of the beam so that the beam is a center; the upper electrode comprise a first upper electrode and a second upper electrode, the first and second upper electrodes being provided on respective sides of the beam so that the beam is a center; and the first lower electrode and the second upper electrode are electrically connected together, and the second lower electrode and the first upper electrode are electrically connected together.

In this optical modulation element, among the four electrodes disposed around the torsional center of the movable member; that is, the first lower electrode, the second lower electrode, the first upper electrode, and the second upper electrode, the first lower electrode and the second upper electrode, which are aligned in a diagonal line, and the second lower electrode and the first upper electrode, which are aligned in another diagonal line, are electrically connected together. By means of applying a voltage to the diagonally-aligned electrodes and the movable member, torque can be imparted in opposite vertical directions to the right and left ends of the movable member with the torsional center interposed therebetween. Large rotational driving force can be obtained. Further, three electrodes can be controlled by a single operation.

According to a sixth aspect of the present invention, there is provided a spatial light modulator as set forth in any of the first to fifth aspects of the invention, wherein the optical function film is a mirror section formed separately from the beam.

In this spatial light modulator, the optical function film is formed by means of providing the beam with a separate mirror section. In this case, the mirror section can be formed from the same material as that of the beam or from an arbitrary different material, thereby increasing the degree of freedom in selecting the material. Further, formation of the mirror section made of a multilayer film becomes feasible, and decreasing of absorption of a reflection surface and enhancement of reflectivity become feasible. Moreover, the mirror section can be imparted with a function of reflecting light of only a specific wavelength.

According to a seventh aspect of the present invention, there is provided a spatial light modulator as set forth in any of the first to sixth aspects of the invention, further comprising: an auxiliary electrode disposed adjacent to the movable member, so as to cause displacement drive force to develop in the movable member by applying a voltage to the auxiliary electrode at an initial driving phase of the movable member.

In this spatial light modulator, displacement driving force achieved in an initial driving phase of the movable member can be particularly increased by applying a voltage to the auxiliary electrode in conjunction with the fixed drive electrode, thereby contributing to realization of higher-speed driving and a decrease in voltage.

According to an eighth aspect of the present invention, there is provided a spatial light modulator array comprising a plurality of spatial light modulators, each of which being a spatial light modulator as set forth in any of the first to seventh aspects of the invention, wherein said plurality of spatial light modulators are arranged one-dimensionally or two-dimensionally.

In this spatial light modulator array, spatial light modulators of identical structure are arranged one-dimensionally or two-dimensionally on the same substrate, whereby the spatial light modulators act as a single light deflection device of reflection type. Accordingly, so long as the spatial light modulators are assembled into an array; e.g., a display device or an exposure device, a plurality of spatial light modulators are homogeneously arranged with high accuracy through semiconductor processes. Light rays output from the respective spatial light modulators corresponding to pixels are easily made equal in terms of intensity, a phase, and a position. As a result, a high-resolution and a high scanning accuracy can be achieved.

According to a ninth aspect of the present invention, there is provided a spatial light modulator array comprising a plurality of spatial light modulators arranged one-dimensionally or two-dimensionally, each of which being a spatial light modulator as set forth in the fifth aspect of the invention, wherein the spatial light modulator array comprises: a plurality of first drive electrodes, each of which including the first lower electrode and the second upper electrode in the spatial light modulator; a plurality of second drive electrodes, each of which including the second lower electrode and the first upper electrode in the spatial light modulator; and a plurality of movable element electrodes, each of which including the conductive section of the movable member in the spatial-light modulator, wherein said plurality of movable element electrodes are commonly connected together, and wherein each of said plurality of spatial light modulators is independently driven by a drive voltage applied to at least one of the first and second drive electrodes in each of said plurality of spatial light modulators.

In this spatial light modulator array, among the three electrodes of each spatial light modulator; that is, the first drive electrode, the second drive electrode, and the movable element electrode, the movable element electrode acts as common wiring. The spatial light modulators are independently driven and controlled by means of the other two drive electrodes; that is, the first drive electrode and the second drive electrode. Accordingly, in a spatial light modulator array element having "n" spatial light modulators, a wiring pattern can be formed with a small number of wiring patterns on the order of (2×n)+1 in contrast with the original number of wires 3×n.

According to a tenth aspect of the present invention, there is provided a spatial light modulator as set forth in the first aspect of the invention, wherein the movable member further comprises a beam, the beam being provided above the substrate so as to hang across the substrate; wherein the optical function film can be displaced vertically with reference to the beam by flexure of the beam; and wherein the fixed drive electrode is disposed outside of a range of displacement path of the movable member defined by the flexure of the beam, and the optical function film is vertically displaced by the drive voltage application.

In this spatial light modulator, the movable member is formed from the beam, which has the optical modulation film and can be displaced vertically. As a result, the overall mass of the movable section and the moment of inertia are reduced, thereby enabling high-speed operation at a low voltage.

According to an eleventh aspect of the present invention, there is provided a spatial light modulator as set forth in the tenth aspect of the invention, wherein the fixed drive electrode is disposed on both sides of the beam so that the beam is a center.

In this spatial light modulator, the position of the fixed drive electrode disposed outside the range of rotational path of the movable member is set on both sides of the beam.

According to a twentieth aspect of the present invention, there is provided a spatial light modulator as set forth in the tenth or eleventh aspect of the invention, wherein the fixed drive electrode has a lower electrode disposed closer to the substrate, with reference to a non-drive position of the beam; and an upper electrode disposed further from the substrate, with reference to the non-drive position.

In this spatial light modulator, each of the fixed drive electrodes provided on the respective sides of the beam has an electrode which is lower then a non-drive position of the beam; and an electrode which is higher than the non-drive position. For instance, a total of four electrodes are disposed around the beam; namely, two electrodes which are lower than the beam with the beam located therebetween and two electrodes which are higher than the beam with the beam located therebetween. Accordingly, the electrodes (i.e., the two lower electrodes and the two upper electrodes) for effectively imparting electrostatic force can be disposed in a void-saving manner at movable ends of the movable member which are subjected to vertical parallel translation.

According to a thirteenth aspect of the present invention, there is provided a spatial light modulator as set forth in the twentieth aspect of the invention, wherein the lower electrode comprises a first lower electrode and a second lower electrode, the first and second lower electrodes being provided on respective sides of the beam so that the beam is a center; the upper electrode comprise a first upper electrode and a second upper electrode, the first and second upper electrodes being provided on respective sides of the beam so that the beam is a center; and the first lower electrode and the second lower electrode are electrically connected together, and the first upper electrode and the second upper electrode are electrically connected together.

In this optical modulation element, among the four electrodes disposed around the movable member; that is, the first lower electrode, the second lower electrode, the first upper electrode, and the second upper electrode, the first lower electrode and the second lower electrode are electrically connected together, and the first upper electrode and the second upper electrode are electrically connected together. By means of applying a voltage to the upper pair of fixed drive electrodes, the lower pair of fixed drive electrodes, and the movable member, vertical electrostatic force can be imparted to the right side and left side of the movable member, whereby large rotational driving force can be obtained. Further, three electrodes can be controlled by a single operation.

According to a fourteenth aspect of the present invention, there is provided a spatial light modulator as set forth in any of the tenth to thirteenth aspects of the invention, wherein the optical function film is a light reflector which reflects radiated light.

This spatial light modulator can modulate light by changing the direction in which light is reflected by a light reflector, as a result of displacement of the movable member.

According to a fifteenth aspect of the present invention, there is provided a spatial light modulator as set forth in any of the tenth to thirteenth aspects of the invention, further comprising a first half mirror formed on the substrate, wherein the optical function film is a second half mirror.

In this spatial light modulator, the length of a light path existing between the first half mirror provided on the substrate and the second half mirror provided on the beam is changed by means of vertical displacement of the beam. Transmission and non-transmission of the light radiated on the first and second half mirrors can be controlled (i.e., optically modulated) by means of interfering action of light (e.g., Fabry-Perot interference).

According to a sixteenth aspect of the present invention, there is provided a spatial light modulator as set forth in any of the tenth to fifteenth aspects of the invention, further comprising: an auxiliary electrode disposed adjacent to the movable member, so as to cause displacement drive force to develop in the movable member by applying a voltage to the auxiliary electrode at an initial driving phase of the movable member.

In this spatial light modulator, displacement driving force achieved in an initial driving phase of the movable member can be particularly increased by applying a voltage to the auxiliary electrode in conjunction with the fixed drive electrode, thereby contributing to realization of higher-speed driving and a decrease in voltage.

According to a seventeenth aspect of the present invention, there is provided a spatial light modulator array comprising a plurality of spatial light modulators, each of which being a spatial light modulator as set forth in the tenth to sixteenth aspect of the invention, wherein said plurality of spatial light modulators are arranged one-dimensionally or two-dimensionally.

In this spatial light modulator array, spatial light modulators of identical structure are arranged one-dimensionally or two-dimensionally on the same substrate, whereby the spatial light modulators act as a single light deflection device of reflection type. Accordingly, so long as the spatial light modulators are assembled into an array; e.g., a display device or an exposure device, a plurality of spatial light modulators are homogeneously arranged with high accuracy through semiconductor processes. Light rays output from the respective spatial light modulators corresponding to pixels are easily made equal in terms of intensity, a phase, and a position. As a result, a high-resolution and a high scanning accuracy can be achieved.

According to an eighteenth aspect of the present invention, there is provided a spatial light modulator array comprising a plurality of spatial light modulators arranged one-dimensionally or two-dimensionally, each of which being a spatial light modulator as set forth in the thirteen aspect of the invention, wherein the spatial light modulator array comprises: a plurality of first drive electrodes, each of which including the first lower electrode and the second lower electrode in the spatial light modulator; a plurality of second drive electrodes, each of which including the first upper electrode and the second upper electrode in the spatial light modulator; and a plurality of movable element electrodes, each of which including the conductive section of the movable member in the spatial light modulator, wherein said plurality of movable element electrodes are commonly connected together; and wherein each of said plurality of spatial light modulators is independently driven by a drive voltage applied to at least one of the first and second drive electrodes in each of said plurality of spatial light modulators.

In this spatial light modulator array, among the three electrodes of each spatial light modulator; that is, the first drive electrode, the second drive electrode, and the movable element electrode, the movable element electrode acts as common wiring. Each spatial light modulator can be independently driven and controlled by means of the other two drive electrodes; that is, the first drive electrode and the second drive electrode. Accordingly, in the spatial light modulator array having "n" spatial light modulators, a wiring pattern can be formed with a small number of wiring patterns on the order of $(2 \times n)+1$ in contrast with the original number of wires $3 \times n$.

According to a nineteenth aspect of the present invention, there is provided a spatial light modulator array as set forth in the ninth or eighteenth aspect of the invention, further comprising: a microlens array having a plurality of microlenses, wherein each of said plurality of microlenses is disposed so as to face the optical functional film of each of said plurality of spatial light modulators arranged one-dimensionally or two-dimensionally.

In this spatial light modulator array, the light gathered by the microlens enters the light reflector of the movable member. When an upper electrode is provided at the entrance side of a light reflector in a spatial light modulator having no microlens, the area of an entrance by way of which light enters the element is reduced, and the incident light is blocked by the upper electrode (or intensity of the incident light is decreased), thereby decreasing the utilization factor of light. In contrast, when the light gathered by the microlens enters the light reflector of the light moving member as in the case of the configuration mentioned above, light can enter the light reflector without being blocked by the upper electrode even in the case of the opening having a small area. As a result, the utilization factor of light is increased, and bright deflected light can be obtained with high efficiency even in the case of the opening having a small area.

According to a twelfth aspect of the present invention, there is provided an exposure apparatus comprising: a spatial light modulator array as set forth in the nineteenth aspect of the invention; and a beam splitter, wherein light originating from a light source enters the spatial light modulator array by way of the beam splitter and the microlens array; and light reflected from the spatial light modulator array again enters the beam splitter by way of the microlens array and is radiated onto an object to be exposed by way of the beam splitter.

In this exposure apparatus, the optical function film can be displaced without occurrence of contact between the movable member and the fixed drive electrode, both belonging to the spatial light modulator. Fixing of the movable element to the fixed drive electrode is prevented, and improved reliability of the element and improved durability of the exposure apparatus are achieved. Moreover, since the footprint of the drive structure is small, there can be obtained an exposure apparatus having a high utilization factor of light.

BRIEF DESCRIPTION OF THE DRAWINGS

FIG. 15 is a electrode wiring diagram of the spatial light modulator shown in FIG. 13;

DETAILED DESCRIPTION OF THE INVENTION

Preferred embodiments of a spatial light modulator, a spatial light modulator array, and an exposure apparatus using them, all pertaining to the present invention, will be described in detail hereunder by reference to the drawings.

Figure 1:
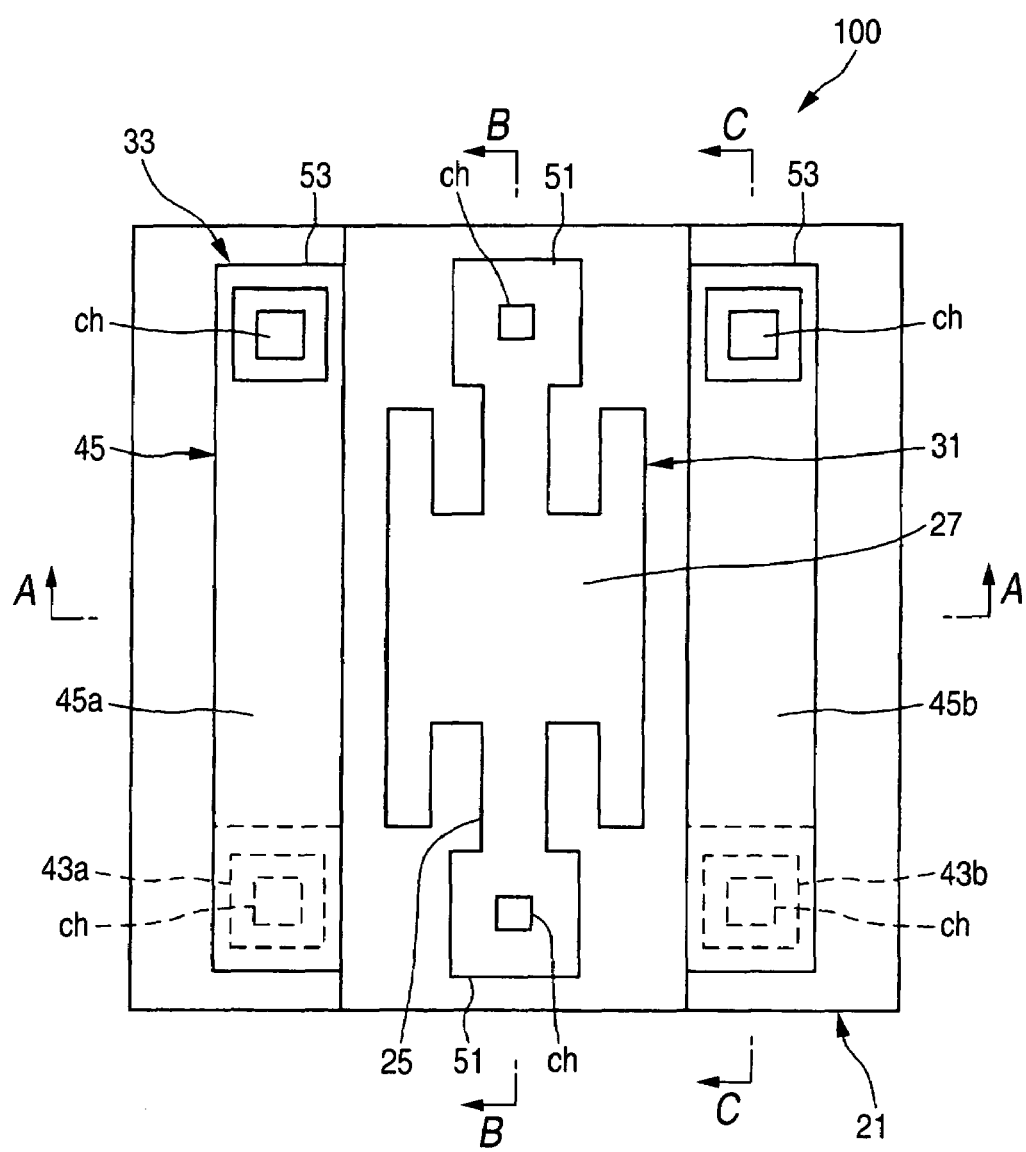
FIG. 1 is a plan view of a first embodiment of a spatial light modulator according to the present invention.
Figure 2A:
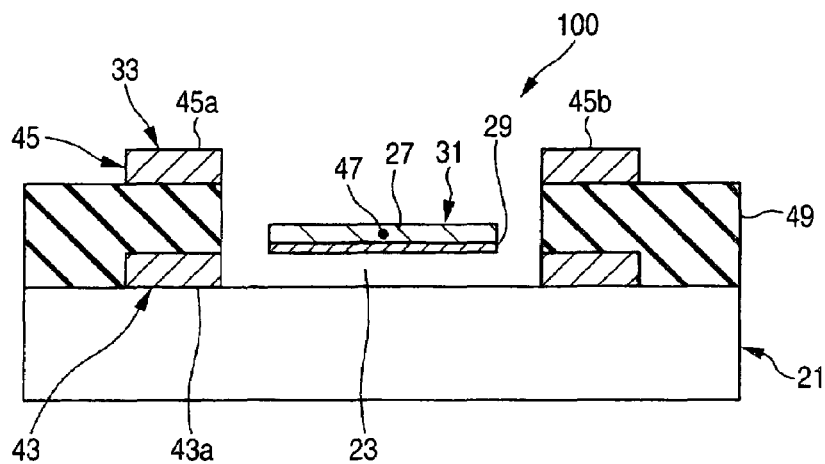
FIG. 2A is a cross-sectional view taken along line A—A shown in FIG. 1.
Figure 2B:
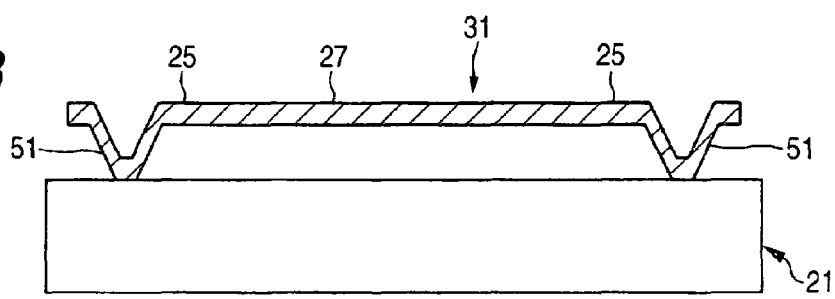
FIG. 2B is a cross-sectional view taken along line B—B shown in FIG. 1.
Figure 2C:
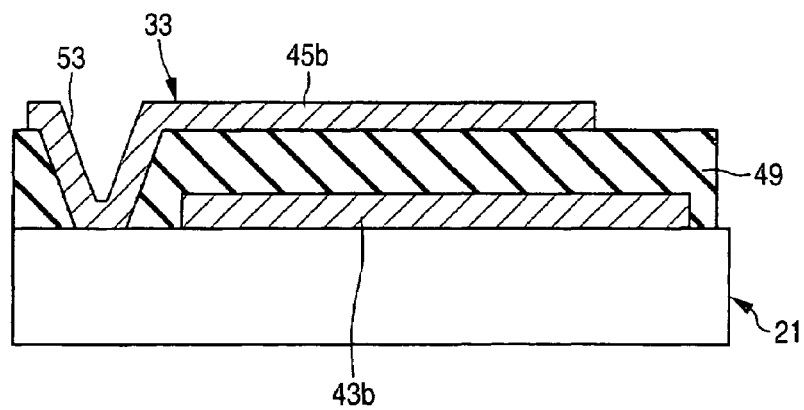
FIG. 2C is a cross-sectional view taken along line C—C shown in FIG. 1.
Figure 3:
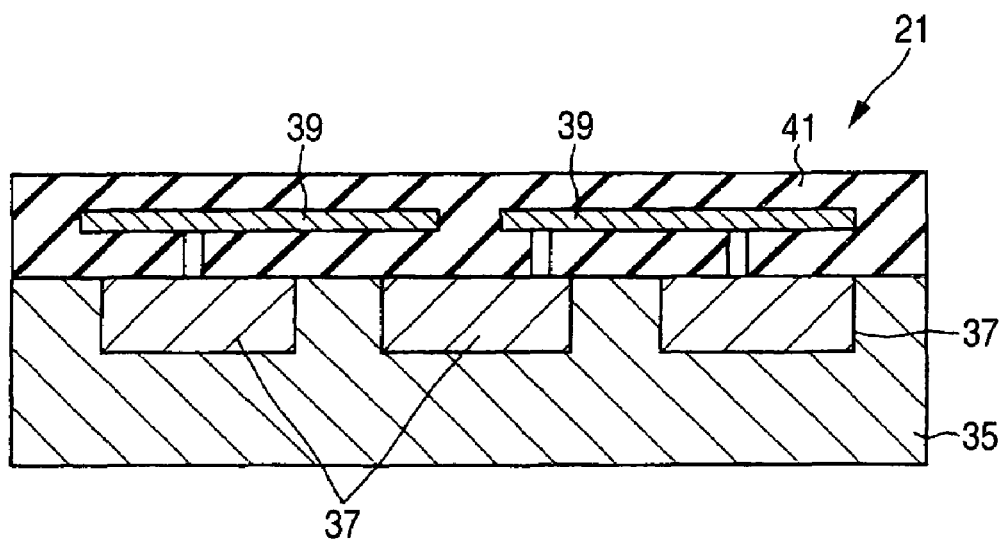
FIG. 3 is a cross-sectional view of the substrate shown in FIG. 1.
Figure 4:
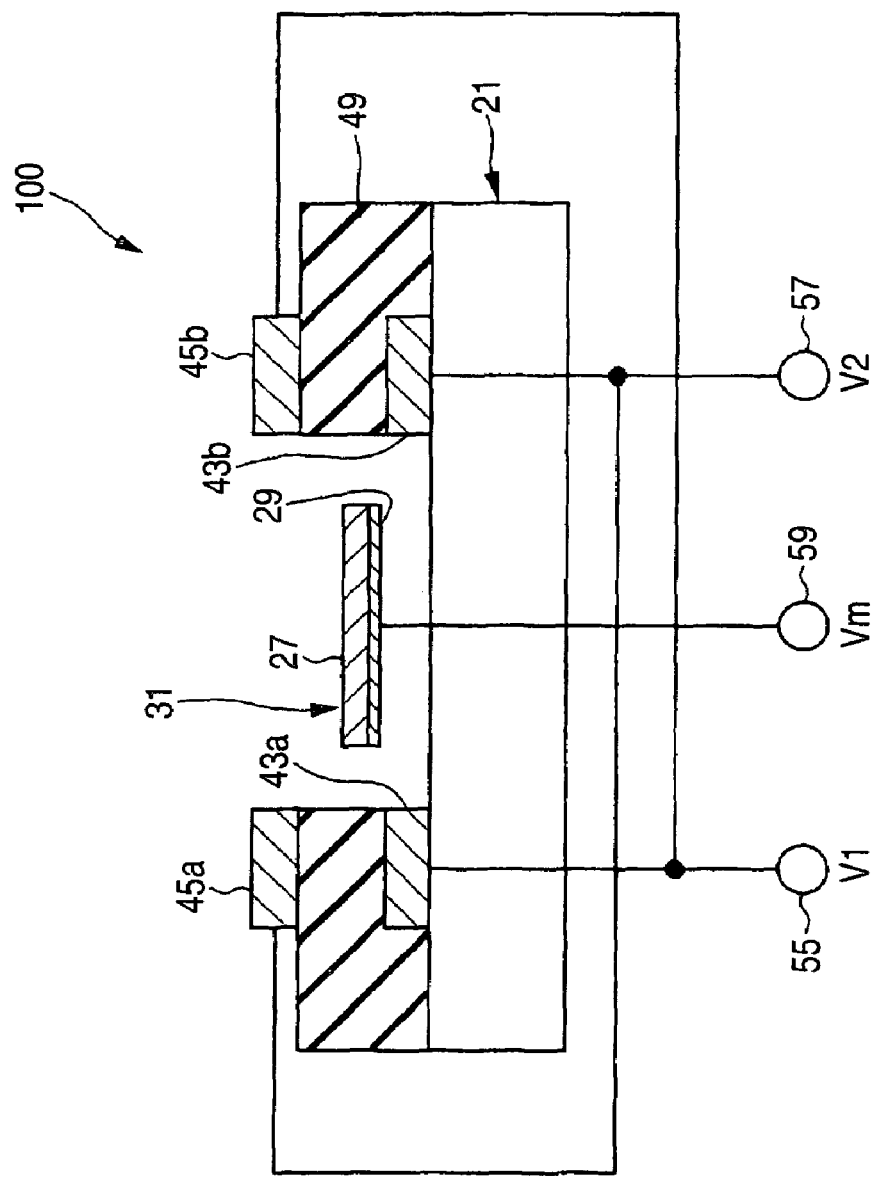
FIG. 4 is an electrode wiring diagram of the spatial light modulator shown in FIG. 1.

FIG. 1 is a plan view of a first embodiment of a spatial light modulator according to the present invention; FIGS. 2A to 2C are cross-sectional views, wherein FIG. 2A is a cross-sectional view taken along line A—A shown in FIG. 1, FIG. 2B is a cross-sectional view taken along line B—B shown in FIG. 1, and FIG. 2C is a cross-sectional view taken along line C—C shown in FIG. 1; FIG. 3 is a cross-sectional view of the substrate shown in FIG. 1; and FIG. 4 is an electrode wiring diagram of the spatial light modulator shown in FIG. 1.

As shown in FIGS. 1 and 2, a spatial light modulator 100 of the present embodiment has, as a basic structural elements, a substrate 21, a movable member 31 having a light reflector (hereinafter also called a "mirror section") 27 and a conductive section 29 provided in at least a portion of the movable member, and a fixed electrode 33. In the light reflector 27, a beam 25 (also called a "hinge") is provided so as to hang across the substrate 21 by way of a void 23, and the light reflector 27 acts as an optical function film which can be rotationally displaced by means of torsion of the hinge 25. The fixed electrode 33 is disposed outside a range of rotation of the movable member 31 defined by torsion of the binge 25. Specifically, the fixed electrode 33 is disposed outside the range of rotation in which mechanical displacement determined by the support structure of the movable member 31 can be performed without controlling a drive voltage. In the drawings, the conductive section 29 is shown as being separate from the mirror section 27. However, when the mirror section 27 is formed from a conductive material; e.g., an aluminum thin film, the conductive section 29 and the mirror section 27 are integral and homogeneous.

Any material, such as an Si substrate or a glass substrate, may be used for the substrate 21. Specifically, as in the case of the embodiment shown in FIG. 3, a circuit (usually a CMOS circuit 37 and a wiring circuit 39 thereof) for driving elements is preferably fabricated on an Si substrate 35, and an upper surface of the substrate is preferably planarized by an insulation layer 41. The previously-described movable member 31 and the fixed electrode 33 are provided on the upper surface of the thus-planarized insulation layer 41. The movable member 31 and the fixed electrode 33 are electrically connected together by way of an unillustrated contact hole formed in the insulation layer 41.

The fixed drive electrode (hereinafter also simply called a "fixed electrode") 33 is provided on both sides of the hinge 25. Here, both sides are defined as a positional relationship in which the fixed electrodes 33 remain out of contact with the movable member 31 and in which the fixed electrodes 33 are provided on both sides of the movable member 31 (i.e., both sides of the movable member 31 shown in FIG. 2A). However, this positional relationship poses no specific limitations on a relative positional relationship between the fixed electrodes 33 disposed on both sides. In the present embodiment, each of the fixed electrodes 33 provided on both sides is formed from a lower electrode and an upper electrode, as will be described later. As a result of the fixed electrodes 33 being disposed on both sides of the hinge 25, electrostatic attractive force to be used for pivotally actuating the movable member 31 in a non-contacting manner can be made optimal.

The fixed electrode 33 has a lower electrode 43 disposed close to the substrate 21 with reference to a non-drive position of the hinge 25, and an upper electrode 45 provided distant from the substrate 21 with reference to the non-drive position of the hinge 25. Here, the non-drive position of the hinge 25 is the position of the hinge achieved when no voltage is applied to the drive electrode and the conductive section of a movable member. Moreover, the lower electrode 43 is formed from a first lower electrode 43a and a second lower electrode 43b, which are disposed with the hinge 25 located therebetween. The upper electrode 45 is formed from a first upper electrode 45a and a second upper electrode 45b, which are disposed with the hinge 25 located therebetween. The lower electrode 43 and the upper electrode 45 are disposed with the hinge 25 located therebetween.

Specifically, two lower electrodes (i.e., the first lower electrode 43a and the second lower electrode 43b) are provided at positions lower than the hinge 25 with the hinge 25 located therebetween. Two upper electrodes (i.e., the first upper electrode 45a and the second upper electrode 45b) are disposed at positions higher than the hinge 25 with the hinge 25 located therebetween. Thus, a total Of four electrodes are disposed around the hinge 25. More specifically, the torsional center 47 of the hinge 25 is located at a point of intersection of a pair of diagonal lines interconnecting the diagonally-aligned upper and lower electrodes (a diagonal line interconnecting the first lower electrode 43a and the second upper electrode 45b, and another diagonal line interconnecting the second lower electrode 43b and the first upper electrode 45a). Accordingly, the electrodes (i.e., the first lower electrode 41a, the second lower electrode 43b, the first upper electrode 45a, and the second upper electrode 45b) for effectively imparting electrostatic force around the torsional center 47 of the movable member 31—which is pivotally actuated around a single axis can be disposed in a void-saving manner.

The first lower electrode 43a and the second lower electrode 45b are disposed outside the rotational displacement path of the mirror section 27 and close to positions below the mirror section 27 and mounted on the substrate 21. The first lower electrode 43a and the second lower electrode 43b are connected to outputs of CMOS circuits 37 via contact holes ch formed in the insulation layer 41. The first lower electrode 43a and the second lower electrode 43b may be formed from any substance, so long as the substance has conductivity, as do metal or semiconductor. Moreover, another insulation layer may be provided on the first and second lower electrodes 43a, 43b.

An insulation layer 49 is provided on the substrate 21 so as to be interposed between the lower electrode 43 and the upper electrode 45. The insulation layer 49 is used for supporting the upper electrode 45 and electrically insulating the upper electrode 45 from the lower electrode 43. In addition to being formed from a plurality of layers, the insulation layer 49 can be formed in the form of an arbitrary edge or side surface.

The hinge 25 is formed at a position above the first and second lower electrodes 43a, 43b and in substantially parallel to the substrate 21 by way of the void 23, Both ends of the hinge 25 are fixed by support sections 51 thereof. The support sections 51 can be depressed into the shape of an essentially quadrangular pyramid. Accordingly, the cross-sectional profile of the support section 51 assumes an inverse triangular shape having a flat portion at a lower section thereof. The flat portions of the hinge 25 are connected to the wiring circuit 39 by way of the contact holes ch drilled in the insulation layer 41. The position of the first lower electrode 43a and that of the second lower electrode 43b are arranged substantially symmetrically about the torsional center 97 of the hinge 25. The essential requirement for the hinge 25 is to possess conductivity. For instance, metal and semiconductor are suitable for the hinge 25. Moreover, the hinge 25 may be formed from a composite consisting of an insulator and a conductor.

Both ends of the hinge 25 are fastened and can be rotationally displaced around the axis of the hinge 25 as a result of torsion of the hinge 25 per se. The elastic force of the hinge 25 is arbitrarily determined on the basis of the shape (e.g., a film thickness, a width, and a length) of and the physical properties (e.g., Young's modulus and Poisson's ratio) of the hinge 25. The movable member 31 can be actively driven clockwise or counterclockwise by means of electrostatic force developing in the vertically-arranged electrodes, and hence the elastic force of the hinge 25 can be set to a small level. The support sections 51 of the hinge 25 may assume any structure other than that mentioned in the embodiment, so long as the support sections 51 are fixed to the substrate 21 by means of the structure.

The mirror section 27 is formed integrally with the hinge 25 at the center of the movable member 31, and the mirror section 27 can be rotationally displaced (pivotally moved) around the torsional center 47 of the hinge 25. The center portion of the hinge 25 assumes the shape of a wing which has a width greater than the width of both end sections of the hinge 25 and extends horizontally in a lateral direction (i.e., a lateral direction in FIG. 1). Moreover, the front and rear sections of the respective right and left wings extend along the hinge 25, to thus form an essentially H-shaped figure when viewed from top. The mirror section 27 has essentially the same H shape as that of the center portion of the hinge 25. The mirror section 27, or the mirror section 27 and the hinge 25, is/are formed from metal or semiconductor and possess(es) conductivity. The surface (a light entrance surface) of the mirror section 27 opposite the substrate 21 or the surfaces (light entrance surfaces) of the mirror section 27 and the hinge 25 opposite the substrate 21 have a reflecting characteristic.

The mirror section 27 may be a composite of a conductor and an insulator. For instance, the mirror section 27 may be formed from a conductor, such as metal and semiconductor, integrally with or separately from the hinge 25, and a multilayer film mirror may be stacked on the mirror section 27. For instance, a multilayer dielectric film or an interference mirror formed from a multilayer of dielectric/metal can be used for the multilayer film mirror. Thereby, there can be achieved an effect of minimizing absorption of incident light by a reflection surface to maximize reflectivity or an effect of reflecting light having a specific wavelength. The mirror section 27 may be a composite consisting of a conductor and an insulator, and a member having a reflecting characteristic may be formed in a part of the mirror section 27. Alternatively, the mirror section 27 may be formed from the same material as that of the hinge 25. In the present embodiment, the conductive section 29 is formed in a part of the mirror section 27 by means of any one of the configurations provided above.

The mirror section 27, or the mirror section 27 and the hinge 25, has/have conductivity and can be electrically connected to the substrate 21 by way of the support sections 51 of the hinge 25. As mentioned above, the mirror section 27 and the hinge 25 may assume any structure and may be formed from any material, so long as the mirror section 27 can be rotationally displaced around the hinge axis (i.e., the torsional center 47) by means of a hinge structure, and the mirror section 27, or the mirror section 27 and the hinge 25, has/have conductivity and can be electrically connected to the substrate 21 by way of the support sections 51.

The first upper electrode 45a and the second upper electrode 45b are disposed outside the rotational displacement path of the movable member 31 (i.e., the hinge 25 and the mirror section 27) and at positions higher than and close to the movable member 31. Both electrodes may assume conductivity, as do metal and semiconductor. Alternatively, support sections 53 having substantially the same shape as that of the support section 51 are formed in both ends of the respective first and second upper electrodes 45a, 45b. The first and second upper electrodes 45a, 45b are supported on the substrate 21 by way of the support sections 53. Accordingly, in the case of the first and second upper electrodes 45a, 45b, the support sections 53 are electrically connected with the wiring circuit 39 by way of the contact holes ch drilled in the insulation layer 41, as in the hinge 25.

The first upper electrode 45a and the second upper electrode 45b are arranged symmetrically about the torsional center 47 of the hinge 25. As a result of the insulation layer 49 being interposed between the first and second upper electrodes 45a, 45b and the substrate 21, the first upper electrode 45a and the second upper electrode 45b are supported while structural rigidity thereof is ensured such that a relative displacement becomes zero or negligible as compared with the hinge 25 and the mirror section 27.

As shown in FIG. 4, in the spatial light modulator 100, the first lower electrode 43a and the second upper electrode 45b are electrically connected together, to thus constitute a first drive electrode 55; and the second lower electrode 43b and the first upper electrode 45a are electrically connected together, to thus constitute a second drive electrode 57, The conductive section 29 of the movable member 31 acts as a movable element electrode 59.

Of the four electrodes disposed around the torsional center 47 of the movable member 31; that is, the first lower electrode 43a, the second lower electrode 43b, the first upper electrode 45a, and the second upper electrode 45b, the first lower electrode 43a and the second upper electrode 45b, which are aligned diagonally with each other, are connected together, as are the second lower electrode 43b and the first upper electrode 45a, which are aligned diagonally with each other. When a voltage is applied to these diagonally-aligned electrodes and the conductive section 29 of the movable member 31, moments of rotation, which are opposite in vertical directions (in a vertical direction shown in FIG. 2A) can be afforded to lateral (a lateral direction in FIG. 1) ends of the movable member 3 with the torsional center 47 being located at midpoint therebetween, whereby great torque can be obtained. Moreover, the three electrodes can be controlled in a single operation.

Operation of the spatial light modulator having the foregoing configuration will now be described.

Figure 5:
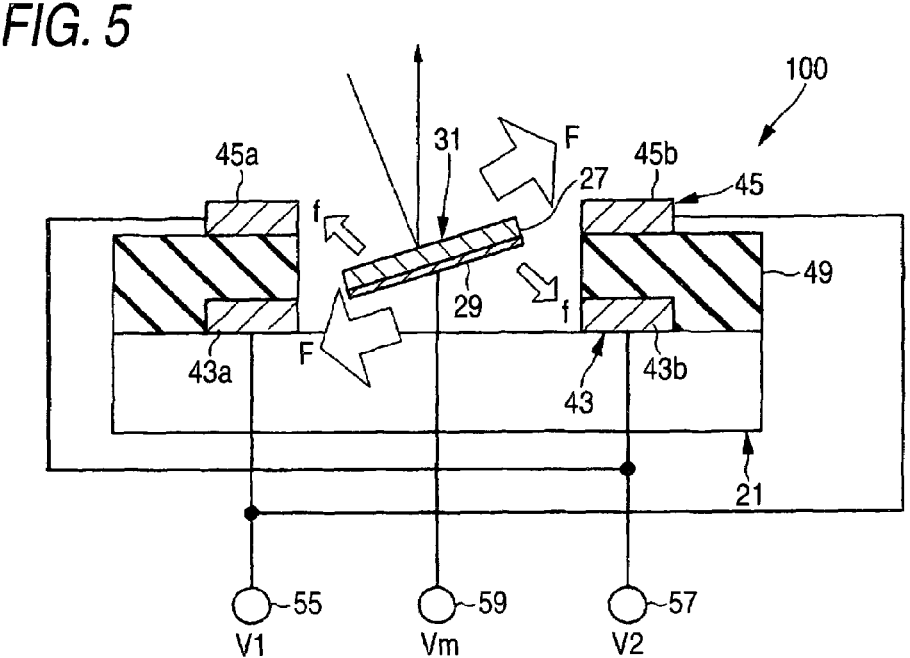
FIG. 5 is an operation descriptive view showing that the spatial light modulator shown in FIG. 1 is tilt leftward.

FIG. 5 is an operation descriptive view showing that the spatial light modulator shown in FIG. 1 is tilted leftward.

Figure 6:
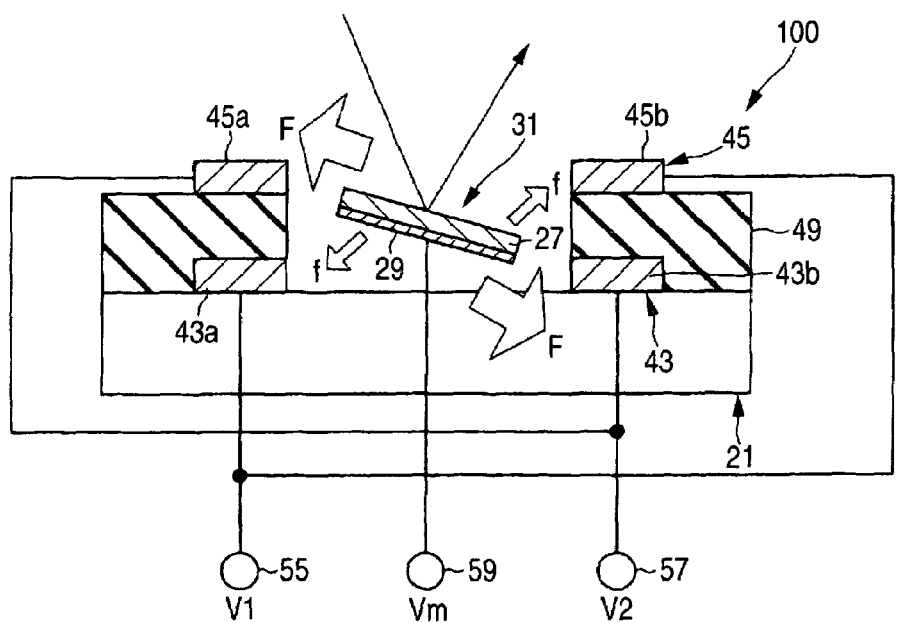
FIG. 6 is a operation descriptive view showing that the spatial light modulator shown in FIG. 1 is tilt rightward.

FIG. 6 is a operation descriptive view showing that the spatial light modulator shown in FIG. 1 is tilted rightward.

The spatial light modulator 100 deflects, as its basic operation, the direction in which light is to be reflected, by means of applying a voltage to the lower electrode 43, the upper electrode 45, and the conductive section 29 to pivotally displace the mirror section 27.

Specifically, when a potential difference is applied to the first lower electrode 43a, the second lower electrode 43b, the first upper electrode 45a, and the second upper electrode 45b with respect to a conductor (i.e., the conductive section 29) consisting of the mirror section and the hinge, electrostatic force develops between the electrodes and a conductor of the movable member consisting of the mirror section and the hinge, and rotational torque acts around the torsional center 47. (see FIG. 2A) of the hinge 25. Accordingly, the mirror section 27 can be rotated clockwise or counterclockwise by means of controlling the potentials of the electrodes. The position where the mirror is to be deflected is determined by the state of the mirror section 27, the electrostatic forces developing in the electrodes at that time, and the elasticity of the hinge 25.

For instance, as shown in FIG. 4, a potential V1 is applied to the first drive electrode 55, which connects the first lower electrode 43a and the second upper electrode 45b together on the substrate 21. A potential V2 is applied to the second drive electrode 57, which connects the second lower electrode 43b and the first upper electrode 45a on the substrate 21. Moreover, a potential Vm is applied to the movable electrode 59 which is the conductive section 29 for the mirror section 27 and the hinge 25. The potentials V1, V2, and Vm are supplied and controlled by a semiconductor integrated circuit (e.g., the CMOS circuit 37) formed on the substrate 21.

Here, it is assumed that a potential between Vm and the potential V1 is V(1) and that a potential between the potential Vm and the potential V2 is V(2). When V(1)=V(2)=0 stands, external force developing in the mirror section 27 is zero, and hence the element maintains the shape assumed upon being formed. As shown in FIG. 4, the mirror section 27 becomes essentially parallel to the substrate 21. This state is stable by virtue of elasticity of the hinge 25.

When V(1)=V(2)≠0 stands, the electrostatic force developing in the mirror section 27 becomes symmetrical with respect to the torsional center 47 of the hinge 25. The state achieved upon the element being formed is maintained, and the mirror section 27 becomes substantially horizontal with respect to the substrate 21.

When at least one V(1) and V(2) is non-zero and V(1) and V(2) are not equal, the electrostatic force developing in the mirror section 27 becomes asymmetrical about the axis of the torsional center 47 of the hinge 25, whereupon the mirror section 27 becomes tilted with reference to the substrate 21.

For instance, when V(1)>V(2) stands, the electrostatic force F generated by the first lower electrode 43a and the second upper electrode 45b is greater than the electrostatic force "f" generated by the second lower electrode 43b and the first upper electrode 45a, and the mirror section 27 is tilted leftward. Conversely, when V(1)<V(2) stands, the electrostatic force F generated by the second lower electrode 43b and the first upper electrode 45a becomes greater than the electrostatic "f" generated by the first lower electrode 43a and the second upper electrode 45b, whereby the mirror section 27 is tilted rightward.

When V(1) and V(2) are sufficiently large, the mirror section 27 can be readily displaced rotationally in an arbitrary direction from a horizontal state even if a difference between V(1) and V(2) is small. When the potentials to be controlled are taken as, e.g., V1 and V2, only a small potential difference is required. Hence, the voltage of the control circuit can be reduced, thereby attaining superiority in terms of cost and integrity.

A great characteristic of the present invention is that the hinge 25, which is a portion of the movable member 31, and the mirror section 27 can be stably displaced and positioned in a non-contacting manner with respect to the optical member. For instance, as shown in FIG. 5, when the absolute value of V(1) is sufficiently large under the assumption that V(1)>V(2), the electrostatic force becomes maximum at the position where the end face (side surface) of the movable member 31 and the end face (side surface) of the first lower electrode 43a approach most closely to each other and the position where the end face (side surface) of the movable member 31 and the end face (side surface) of the second upper electrode 45b approach most closely to each other. At this time, displacement of the movable member 31 is stopped stably. Accordingly, the displacement angle of the movable member 31 is stably determined by mean is of a structural position of the movable member 31 and structural positions of the respective electrodes, and highly accurate control of the mirror deflection angle becomes feasible. Moreover, since the movable member 31 remains out of contact with the fixed electrode 33, there is no challenge to be met, such as adhesion (fixing), and hence highly reliable, high-speed control becomes possible.

As mentioned above, potentials are supplied as the electrodes V1, V2, and Vm, as required, whereby the mirror section 27 can be displaced to an arbitrary position, such as a counterclockwise position, a clockwise position, or a horizontal position, by means of the electrostatic forces developing in the respective electrodes and the elasticity of the hinge 25. The driving method employed at this time may be any one selected from an analog control operation (control operation for effecting arbitrary displacement) and a digital control operation (control operation for effecting, e.g., binary displacement).

The electrode wiring and the method for displacing the mirror section 27 by means of controlling the potentials are provided as an embodiment, and the present invention is not limited to this embodiment.

The method for manufacturing the reflection-type light deflection element 100 will now be described.

FIGS. 7A to 7F are cross-sectional views which are taken along lines A—A and B—B in FIG. 1 and which show example processes for manufacturing the spatial light modulator shown in FIG. 1.

As shown in FIG. 7A, the substrate 21 is formed by means of forming a CMOS circuit (not shown) in the Si substrate 35 and forming a first $SiO_2$ insulation film (not shown) on the CMOS circuit. After the surface of the first $SiO_2$ insulation film has been planarized by means of CMP, contact holes are formed for connecting an output from the drive circuit to the respective electrodes.

An unillustrated first aluminum thin film (preferably an aluminum alloy containing metal of high fusing point) is formed on the substrate 21 by means of sputtering. The first aluminum thin film is then patterned into the geometry of a desired electrode by means of ordinary photolithography. As shown in FIG. 7B, the first lower electrode 43a and the second lower electrode 43b are formed. At this time, contact holes are formed in the insulation layer 41 (see FIG. 3), and the first and second lower electrodes 43a, 43b are connected to output terminals of the wiring circuits 39 and are supplied with the respective potentials. The lower electrode 43, the hinge 25 to be described later, and the mirror section 27 must be brought into close proximity to each other with high accuracy. Photolithography is performed preferably through use of a stepper, and etching is preferably performed by means of dry etching.

Next, as shown in FIG. 7C, the insulation layer 49 of $SiO_2$ or $SiN_x$ is formed by means of PE-CVD (plasma CVD). This insulation layer 49 acts as an interlayer insulation film between the lower electrode 43 and the upper electrode 45 to be described later. Moreover, the thickness of the insulation layer 49 determines the position of the upper electrode 45. Subsequently, the insulation layer 49 is patterned by means of ordinary photolithography. Moreover, the end face of the insulation layer 49 must be brought into close proximity to the hinge 25 and the mirror section 27 with high accuracy. Hence, photolithography is effected preferably through use of the stepper, and etching is preferably performed by means of dry etching.

As shown in FIG. 7D, a resist 61 of positive type is applied over the substrate 21, and an area where a support section 51 of the hinge 25 is to be formed is hard-baked through patterning. By means of surface tension yielded at the time of formation of resist, the surface of the resist becomes flat, without regard to steps in a base film. This resist layer acts as a sacrificial layer and will be removed in subsequent processes to thus form the void 23. Accordingly, the thickness of the resist 61 achieved after hard baking determines a future spatial position of the movable member 31 (formed from the hinge 25 and the mirror section 27). Photosensitive polyimide can also be preferably used in lieu of the resist 61.

As shown in FIG. 7E, a second aluminum thin film (preferably an aluminum alloy containing metal of high fusing point) is formed by means of sputtering. Subsequently, the first and second upper electrodes 45a, 45b, the hinge 25, the support section 51, and the mirror section 27 are formed by means of photolithography. The first upper electrode 45a and the second upper electrode 45b are connected to the wiring circuit 39 of the substrate 21 by way of the contact holes. In the present embodiment, the first and second upper electrodes 45a, 45b are connected to the secondhand first lower electrodes 43b, 43a on the substrate 21. The hinge 25 is connected to an output terminal of the CMOS circuit 37 in the substrate 21 by way of the support section 51 and supplied with a potential. The upper electrode 45 and the movable member 31, both belonging to the spatial light modulator, must be brought into close proximity to each other with high accuracy. For this reason, photolithography is preferably performed through use of the stepper, and etching is preferably performed by means of dry etching.

Figure 7:
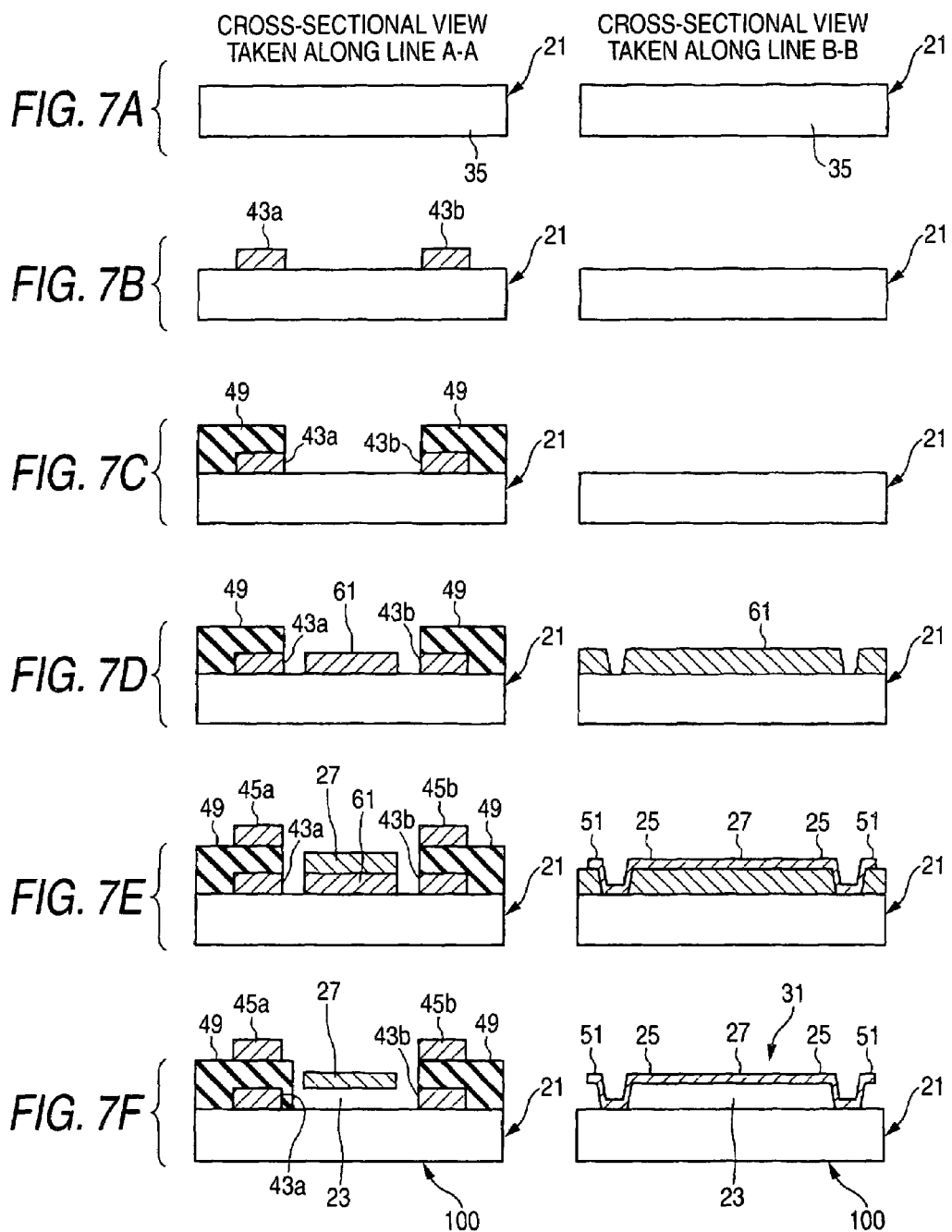
FIGS. 7A to 7F are cross-sectional views which are taken along lines A—A and B—B and which show example processes for manufacturing the spatial light modulator shown in FIG. 1.

Although the conductive section 29 is not shown in FIG. 7, the mirror section 27 and the conductive section 29 are formed integrally and homogeneously in the embodiment, and hence the mirror section 27 also performs the function of the conductive section 29.

Finally, as shown in FIG. 7F, the resist 61 serving as the sacrificial layer is removed by means of oxygen-gas-based plasma etching, to thus form the void 23. As a result, the hinge 25 and the mirror section 27 can be rotationally displaced about the torsional center 47 of the hinge 25.

In addition to having the foregoing processes, the method for manufacturing the spatial light modulator 100 has the following process variations.

Specifically, structural materials of the lower electrode 43, the upper electrode 45, and the hinge 25 may be materials other than conductive aluminum. For instance, crystalline Si, polcrystalline Si, metal (Cr, Mo, Ta, Ni, etc), metal suicide, and conductive organic material are preferable.

An insulation film (e.g., $SiO_2$, $SiN_x$) for protection purpose may be stacked on the substrate 21. Alternatively, there can also be employed a hybrid structure formed by stacking a conductive thin film, such as metal, on an insulating thin film, such as $SiO_2$, $SiN_x$, BSG, a metal oxide film, or polymer.

Material other than the previously-described materials can be used for the insulation layer 49. Alternatively, there can also be employed a hybrid structure formed by stacking a conductive thin film, such as metal, on an insulating thin film, such as $SiO_2$, $SiN_x$, BSG, a metal oxide film, or polymer.

Although in the present embodiment the resist material is used as the sacrificial layer, the sacrificial layer is not limited to the resist material. For instance, metal, such as aluminum or Cu, or an insulating material, such as $SiO_2$, can also be used as a sacrificial layer. In this case, a material resistant to corrosion or damage, which would otherwise be caused at the time of removal of the sacrificial layer, is selected for the structural material, as required.

In addition to dry etching (plasma etching), wet etching can also be used as the method for removing the sacrificial layer, depending on a combination of a known structural material and a sacrificial layer. In the case of wet etching, a structural member does not cause sticking, which would otherwise be caused by surface tension, during rinsing and drying processes subsequent to the etching process, and hence a drying method, such as a supercritical drying method or a freeze-drying method, is preferable.

In addition, a structure, a material, and a process are not limited to those described in connection with the embodiment, so long as they satisfy the gist of the invention.

Accordingly, in the spatial light modulator 100, the movable member 31 is brought out of contact with the optical member and can be positioned at a predetermined location in a non-contacting manner by means of the fixed electrode. The movable member 31 is constituted of the mirror section 27 and the hinge 25, which has the conductive section 29 and can be twisted. As a result, the overall mass of the movable section is reduced, and moment of inertia is also decreased, to thus enable high-speed operation at a low voltage.

A voltage is applied to the conductive section 29 of the movable member 31 and to the fixed electrode 33 disposed outside the range of rotational path of the movable member 31, whereby the movable member 31 and the fixed electrode 33 do not come into contact with each other. As a result, the mirror section 27 can be pivotally displaced in a non-contacting manner and is prevented from affixing to the fixed electrode 33, thereby improving the reliability of the element.

As compared with a conventional element having a so-called comb drive structure, the element of the present invention has a simple structure, thereby facilitating miniaturization of the element and realization of a one-dimensional array and a two-dimensional array. In addition to these advantages, the footprint of the drive structure is also reduced (i.e., light is prevented from being blocked by the area where the drive structure is formed), and hence an improvement in utilization factor of the light and easy achievement of high resolution are attained.

The movable member 31 is actively pivoted not by the spring force of the hinge 25 but by the four fixed electrodes 33 disposed around and outside the range of rotational path of the movable member 31. Consequently, the spring force of the hinge 25 required in the case of the structure that restores the movable member 31 by utilization of the spring force is obviated, thereby diminishing drive resistance yielded when the spring force is increased and enabling high-speed operation at a low voltage.

A spatial light modulator according to a second embodiment of the present invention will now be described.

Figure 8:
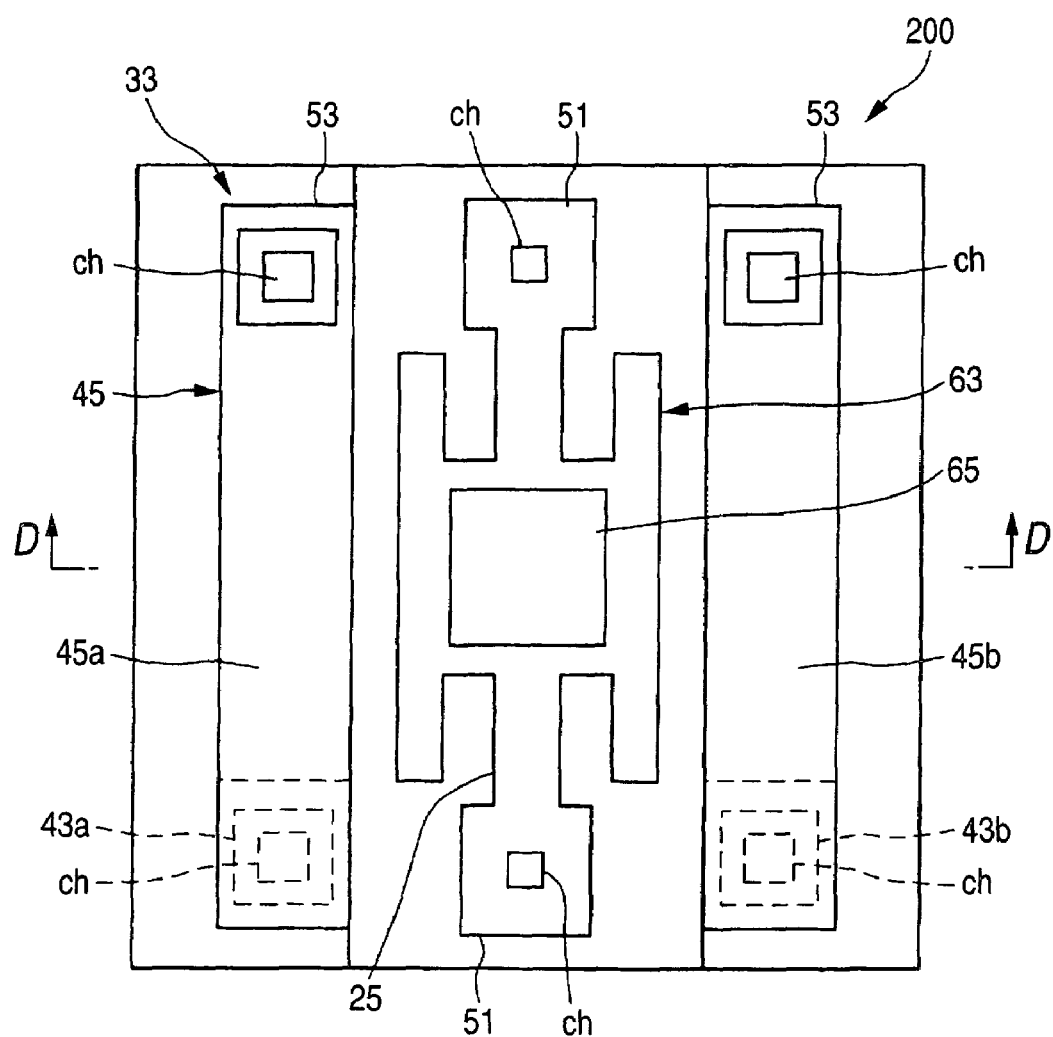
FIG. 8 is a plan view of the spatial light modulator of the second embodiment attached to the beam of a separate mirror section.
Figure 9:
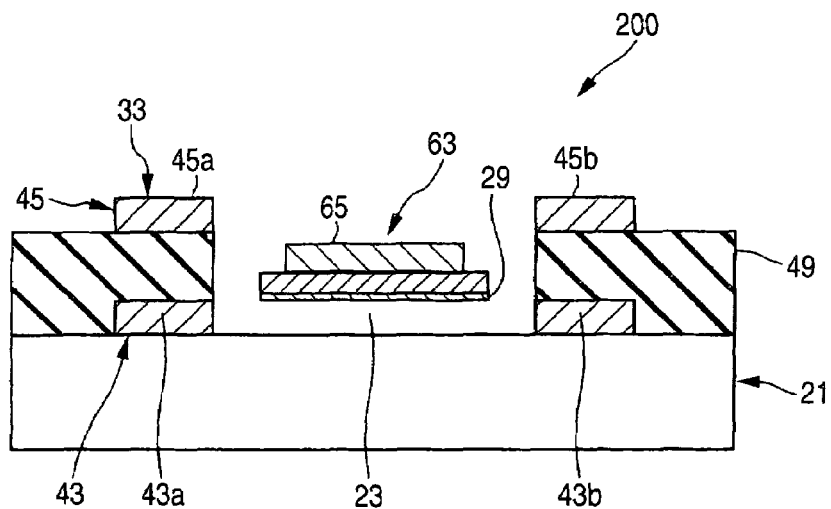
FIG. 9 is a cross-sectional view taken along line D—D shown in FIG. 8.

FIG. 8 is a plan view of the spatial light modulator of the second embodiment attached to the beam of a separate mirror section, and FIG. 9 is a cross-sectional view taken along line D—D shown in FIG. 8. In embodiments and modifications provided below, those elements which are the same as those shown in FIGS. 1 through 7 are assigned the same reference numerals, and repeated explanations thereof are omitted.

In a spatial light modulator 200 of the present embodiment, a movable member 63 differs from the movable member 31. Specifically, the light reflector is embodied as a separate mirror section 65 attached to the hinge 25. The mirror section 65 is provided at least at an entrance opening section formed in the hinge 25. For instance, the mirror section 65 is newly formed, on the hinge 25 made of metal such as aluminum, from the same material as that of the hinge 25. The mirror section 65 may also be formed from a multilayer film on the hinge 25 made of metal, such as aluminum.

An interference mirror—which is made of, e.g., a multilayer film of dielectric or a multilayer film of dielectric/metal—is a known example of the multilayer film mirror. The interference mirror yields an effect of greatly increasing reflectance and an effect of reflecting light of a specific wavelength.

The mirror section 65 is a composite consisting of the conductive section 29 and an insulator, and a member having reflectance may be formed in apart of the mirror section. The mirror section 65, or the mirror section 65 and the hinge 25, are conductive and can be electrically connected together on the substrate 21 byway of the support section 51. As mentioned above, the mirror section 65 and the hinge 25 may be formed in an arbitrary structure and from an arbitrary material, so long as they are rotationally displaceable about the torsional center 47 of the hinge 25, have conductivity, and can be electrically connected on the substrate 21 by way of the support section 51.

According to the spatial light modulator 200 having such a configuration, the mirror section 65 can be formed from the same material as that of the hinge 25 or of an arbitrary different material, thereby increasing the degree of freedom of selection of material. A multilayer film can be readily applied to the mirror section 65, whereby a reduction in absorption on the reflection surface and an increase in reflectivity can be achieved. Moreover, an operation for reflecting only light of a specific wavelength can also be afforded to the spatial light modulator.

Modifications of the first and second embodiments will now be described.

[First Modification of the First and Second Embodiments]

Figure 10:
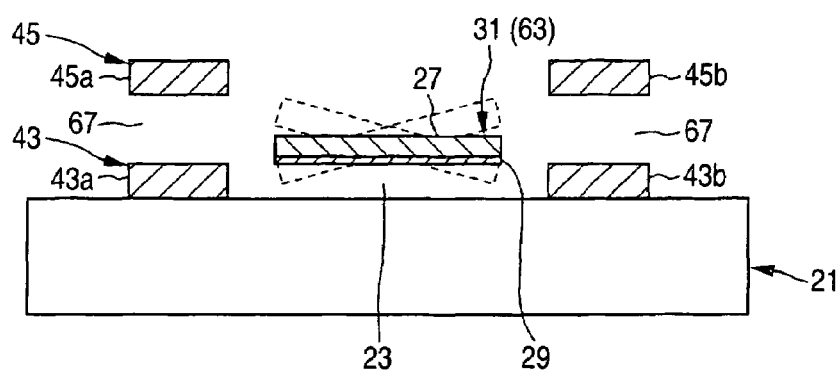
FIG. 10 is a cross-sectional view of a first modification of the first and second embodiments taken along line D—D, in which a void is provided between the upper and lower electrodes.

FIG. 10 is a cross-sectional view of a first modification of the first and second embodiments taken along line D—D, wherein a void is provided between the upper and lower electrodes.

The insulation layer 49 provided between the lower electrode 43 and the upper electrode 45 may be omitted from the spatial light modulator 100 (or the spatial light modulator 200), to thus form a void 67. In this case, the upper electrode 45 is supported and fixed by the support sections 53 formed at both ends in the direction in which the upper electrode 45 extends (i.e. the direction perpendicular to the paper plane of FIG. 10).

According to the first modification, the amount of static electricity developing between the electrodes is diminished, thereby enabling an improvement in power efficiency and high-speed operation attributable to a decrease in electrical delay.

[Second Modification of the First and Second Embodiments]

Figure 11:
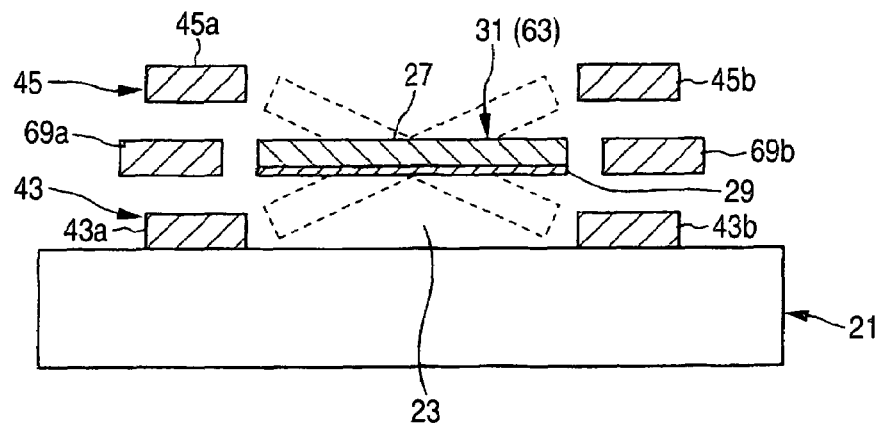
FIG. 11 is a cross-sectional view of a second modification of the first and second embodiments taken along line D—D, in which an intermediate electrode is provided between the upper and lower electrodes.

FIG. 11 is a cross-sectional view of a second modification of the first and second embodiments taken along line D—D, wherein an intermediate electrode is provided between the upper and lower electrodes.

In the spatial light modulator 100 (or the spatial light modulator 200), no limitations are imposed on the number of control electrodes. For instance, as shown in FIG. 11, intermediate electrodes 69*a*, 69*b* may also be provided between the lower electrode 43 and the upper electrode 45, and the electrodes may be connected together, as required, and controlled.

According to the second modification, the number of positions at which electrostatic force is to be afforded to the movable member 31 (or the movable member 63) is increased, thereby enabling more accurate, stable control of the movable member 31 (or the movable member 63).

[Third Modification of the First and Second Embodiments]

Figure 12:
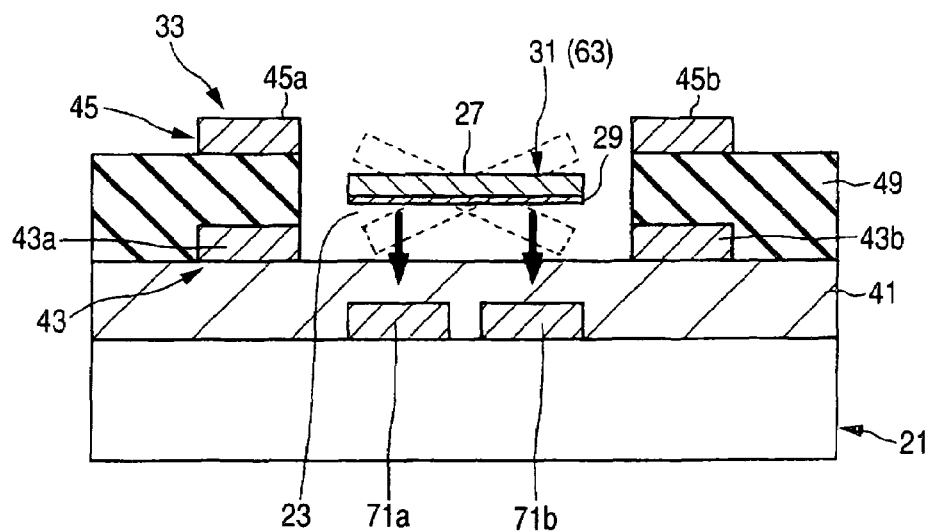
FIG. 12 is a cross-sectional view of a third modification of the first and second embodiments taken along line D—D, in which an auxiliary electrode is provided between the first and second lower electrodes.

FIG. 12 is a cross-sectional view of a third modification of the first and second embodiments taken along line D—D, wherein an auxiliary electrode is provided between the first and second lower electrodes.

As shown in FIG. 12, the spatial light modulator 100 (or the spatial light modulator 200) may be provided with auxiliary electrodes 71*a*, 71*b*. According to the configuration of the electrodes set forth, electrostatic force acts only on end faces (or side surfaces) of the electrodes. Hence, when the hinge 25 and the mirror section 27 are spaced far apart from the end face of the electrodes (i.e., when the deflection angle is large), electrostatic force developing in an initial phase becomes smaller. For this reason, a drive voltage required for generating the electrostatic force is increased, and a response time becomes also longer.

In contrast, according to the third modification, the auxiliary electrodes 71*a*, 71*b* are provided below the hinge 25 and the mirror section 27, to thus increase the area of electrodes opposing the hinge 25 and the mirror section 27, thereby shortening a distance (a void). Rotational torque is generated in an initial phase of application of a drive voltage, by means of primarily the auxiliary electrodes 71*a*, 71*b*. When the hinge 25 and the mirror section 27 have been rotated and end faces of the hinge 25 and those of the mirror section 27 have approached the end faces of the upper electrode 45 (or the lower electrode 43), electrostatic force is increased. As a result, the hinge 25 and the mirror section 27 are maintained in a non-contact state without coming into contact with the insulation layer 41.

As mentioned above, the hinge 25 and the mirror section 27 can be stably positioned and stopped at predetermined locations without contacting other optical members. Concurrently, high-speed drive can be effected at a low voltage.

A spatial light modulator according to a third embodiment of the present invention will now be described.

Figure 13:
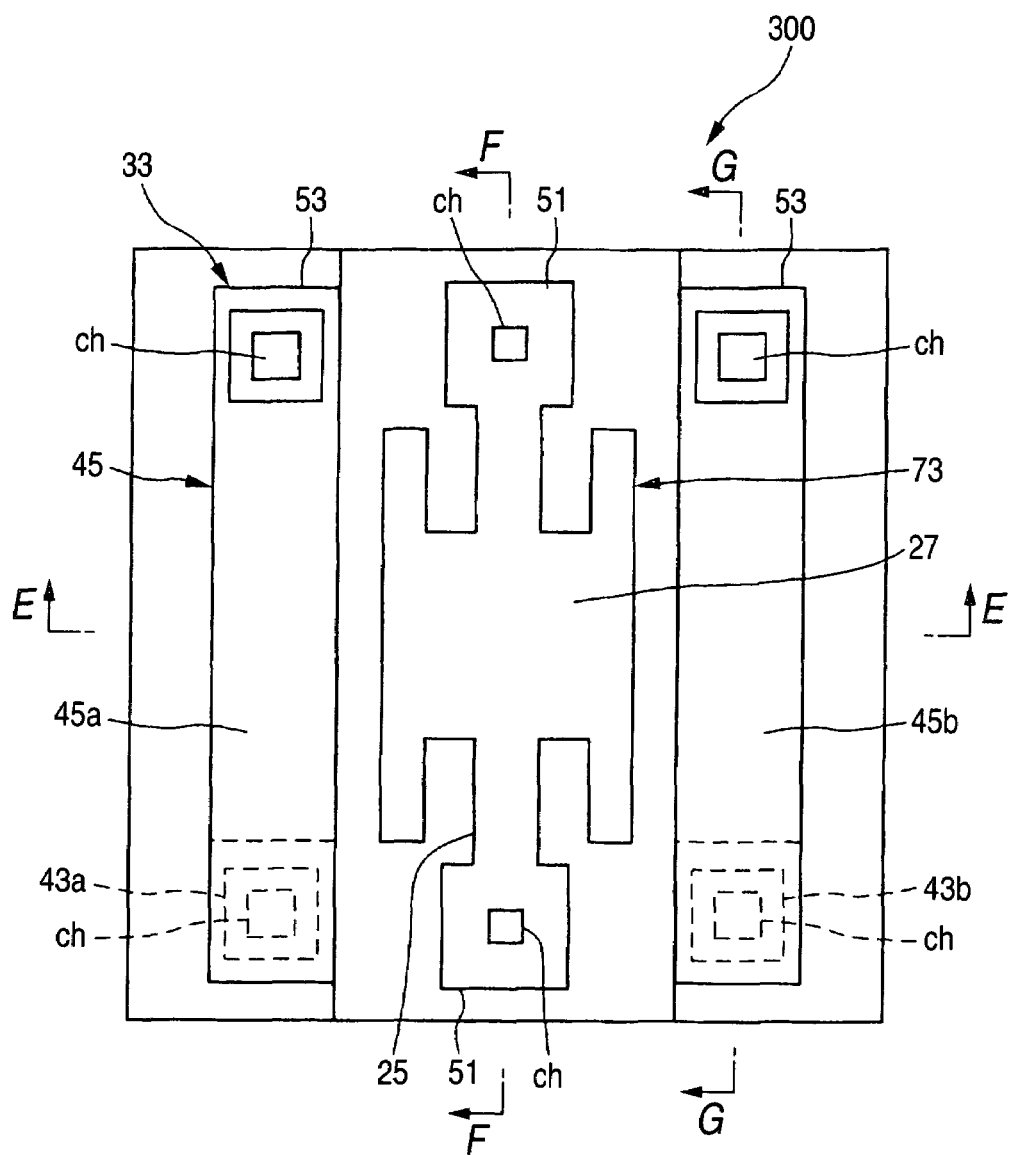
FIG. 13 is a plan view of a third embodiment of a spatial light modulator according to the present invention.
Figure 14A:
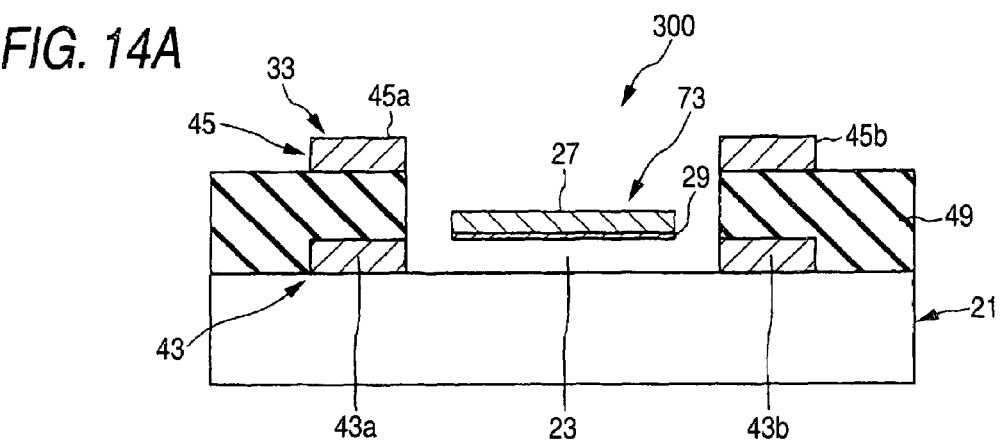
FIG. 14A is a cross-sectional view taken along line E—E shown in FIG. 13.
Figure 14B:
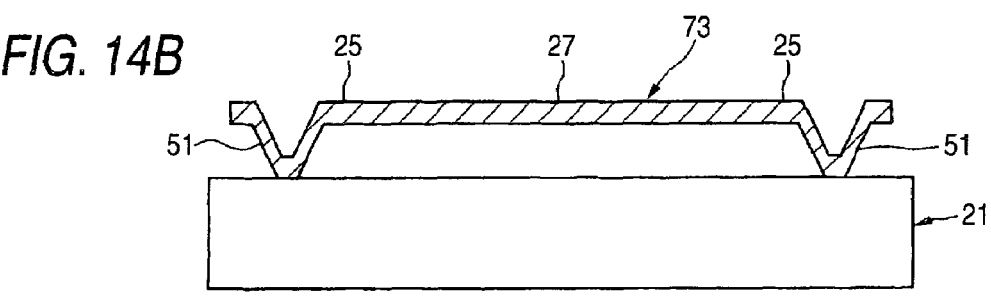
FIG. 14B is a cross-sectional view taken along line F—F shown in FIG. 13.
Figure 14C:
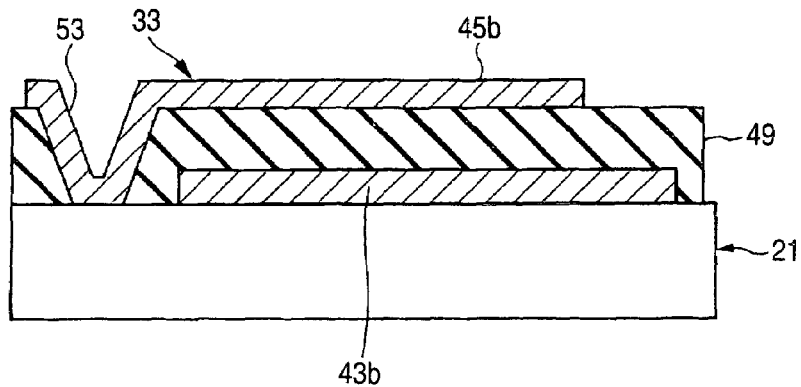
FIG. 14C is a cross-sectional view taken along line G—G shown in FIG. 13.

FIG. 13 is a plan view of a third embodiment of a spatial light modulator according to the present invention; FIGS. 14A to 14C are cross-sectional views, wherein FIG. 14A is a cross-sectional view taken along line E—E shown in FIG. 13, FIG. 14B is a cross-sectional view taken along line F—F shown in FIG. 13, and FIG. 14C is a cross-sectional view taken along line G—G shown in FIG. 13; and FIG. 15 is a electrode wiring diagram of the spatial light modulator shown in FIG. 13.

A spatial light modulator 300 of the present embodiment has the substrate 21; a movable member 73 having the hinge 25 provided so as to hang across the substrate 21, the mirror section 27 which is a light reflector capable of being vertically displaced by means of flexure of the hinge 25, and the conductive section 29 provided in at least a portion of the movable member; and the fixed electrode 33 disposed outside the range of vertical displacement path of the movable member 73 induced by the flexure of the hinge 25. The mirror section 27 is vertically displaced by means of applying a voltage to the conductive section 29 of the movable member 73 and the fixed electrode 33, thereby changing the length of the optical path of the light.

The spatial light modulator 300 of the present embodiment is basically identical in configuration with the spatial light modulator 100. In the case of the spatial light modulator 100, the movable member 73 is displaced in the direction of torsion. In contrast, in the case of the spatial light modulator 300 of the embodiment, the movable member 73 is displaced vertically with respect to the substrate 21. Accordingly, elements which are substantially identical with those of the spatial light modulator 100 can be used for the constituent elements.

Specifically, the substrate 21 has the CMOS circuit 37 and the wiring circuit 39 thereof, and the upper surface of the substrate 21 is planarized by the insulation layer 41. The fixed electrode 33 is provided on the upper surface of the planarized insulation layer 41 and electrically connected to the substrate 21 by way of the contact hole formed in the insulation layer 41.

The fixed electrode 33 has the lower electrode 43 disposed close to the substrate 21 with reference to the non-drive position of the hinge 25, and the upper electrode 45 provided distant from the substrate 21 with reference to the non-drive position of the hinge 25. Here, the lower electrode 43 is formed from the first lower electrode 43a and the second lower electrode 43b, which are disposed with the hinge 25 located therebetween. The upper electrode 45 is formed from the first upper electrode 45a and the second upper electrode 45b, which are disposed with the hinge 25 located therebetween.

The insulation layer 49 is provided on the substrate 21 so as to be interposed between the lower electrode 43 and the upper electrode 45. The insulation layer 49 is used for supporting the upper electrode 45 and electrically insulating the upper electrode 45 from the lower electrode 43.

The hinge 25 is formed at a position above the first and second lower electrodes 43a, 43b and in substantially parallel to the substrate 21 by way of the void 23. Both ends of the hinge 25 are fixed by the support sections 51 thereof. The hinge 25 is connected to the wiring circuit 39 by way of the contact holes ch drilled in the insulation layer 41.

Both ends of the hinge 25 are fastened, and the hinge 25 can be vertically displaced as a result of being vertically deflected. The elastic force of the hinge 25 is arbitrarily determined on the basis of the shape (e.g., a film thickness, a width, and a length) and physical properties (e.g., Young's modulus and Poisson's ratio) of the hinge 25. The movable member 73 can be actively driven vertically by means of electrostatic force developing in the vertically-arranged electrodes, and hence the elastic force of the hinge 25 can be set to a low level.

The mirror section 27 is formed integrally with the hinge 25 at the center of the movable member 73, and the mirror section 27 can be vertically displaced as a result of deflection of the hinge 25. The center portion of the hinge 25 assumes the shape of a wing which has a width greater than the width of both end sections of the hinge 25 and extends horizontally in a lateral direction (i.e., a lateral direction in FIG. 13). Moreover, the front and rear sections of the respective right and left wings extend along the hinge 25, to thus form an essentially H-shaped figure when viewed from the top. The mirror section 27 has essentially the same H shape as that of the center portion of the hinge 25.

The mirror section 27, or the mirror section 27 and the hinge 25, has/have conductivity and can be electrically connected to the substrate 21 by way of the support sections 51 of the hinge 25. As mentioned above, the mirror section 27 and the hinge 25 may assume any structure and may be formed from any material, so long as the mirror section 27 can be vertically displaced by means of a hinge structure, and the mirror section 27, or the mirror section 27 and the hinge 25, has/have conductivity and can be electrically connected to the substrate 21 by way of the support sections 51.

The first upper electrode 45a and the second upper electrode 45b are disposed outside the vertical displacement path of the movable member 73 (i.e., the hinge 25 and the mirror section 27) and at positions higher than and close to the movable member 73. The support sections 53 having substantially the same shape as that of the support section 51 are formed at both ends of the respective first and second upper electrodes 45a, 45b. The first and second upper electrodes 45a, 45b are supported on the substrate 21 by way of the support sections 53. Accordingly, as in the case of the hinge 25, in the case of the first and second upper electrodes 45a, 45b, the support sections 53 are electrically connected with the wiring circuit 39 by way of the contact holes ch drilled in the insulation layer 41.

As shown in FIG. 15, in the spatial light modulator 300, the first lower electrode 43a and the second lower electrode 43b are electrically connected together, to thus constitute a first drive electrode 75; and the first upper electrode 45a and the second upper electrode 45b are electrically connected together, to thus constitute a second drive electrode 77. The conductive section 29 of the movable member 31 acts as a movable element electrode 79.

Of the four electrodes disposed around the movable member 73; that is, the first lower electrode 43a, the second lower electrode 43b, the first upper electrode 45a, and the second upper electrode 45b, the lower electrodes 43 are electrically connected together, and the upper electrodes 45 are electrically connected together. When a voltage is applied to these electrodes and the conductive section 29 of the movable member 73, vertical electrostatic force can be afforded to both lateral ends (i.e., the lateral ends shown in FIG. 15), whereupon large vertical drive force can be obtained. Moreover, the three electrodes can be controlled in a single operation.

Operation of the spatial light modulator 300 having the foregoing configuration will now be described.

Figure 16:
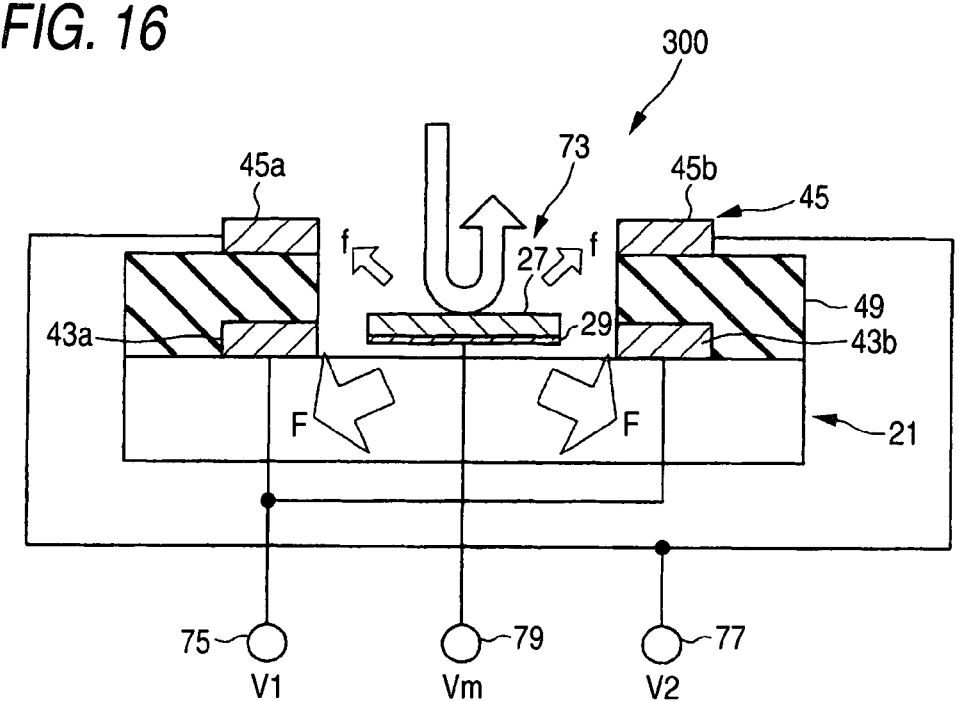
FIG. 16 is an operation descriptive view showing that the spatial light modulator shown in FIG. 13 is vertically displaced in a downward direction.
Figure 17:
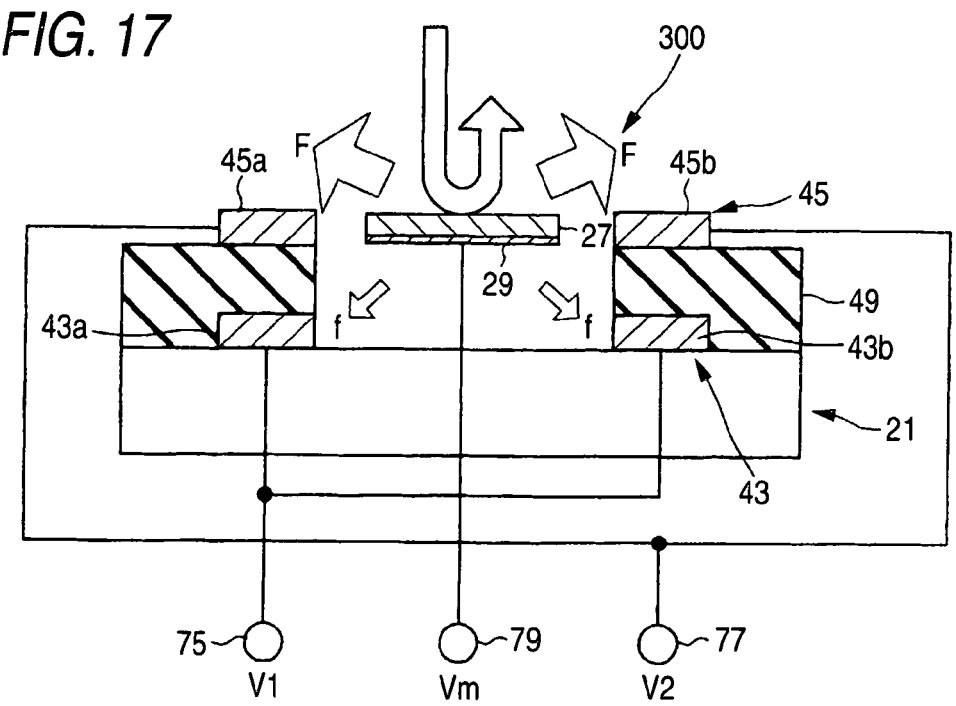
FIG. 17 is a operation descriptive view showing that the spatial light modulator shown in FIG. 13 is vertically displaced in an upward direction.

FIG. 16 is an operation descriptive view showing that the spatial light modulator shown in FIG. 13 is vertically displaced in a downward direction. FIG. 17 is an operation descriptive view showing that the spatial light modulator shown in FIG. 13 is vertically displaced in an upward direction.

When a potential difference is applied to the first upper electrode 45a, the second upper electrode 45b, the first lower electrode 43a, and the second lower electrode 43b with respect to the conductive section 29 of the movable member 73, electrostatic force develops between the end faces (or side surfaces) of the electrodes and the end face (or side surface) of the conductive section 29 of the movable member 73. Consequently, the mirror section 27 can be displaced in a substantially vertical direction with reference to the substrate 21 by means of controlling the potentials of the respective electrodes. The position where the mirror section is to be deflected is determined by the state of the mirror section 27, the electrostatic forces developing in the electrodes at that time, and the elasticity of the hinge 25.

For instance, as shown in FIG. 16, the first lower electrode 43a and the second lower electrode 43b are connected together on the substrate 21, and the potential V1 is applied to them. The first upper electrode 45a and the second upper electrode 45b are connected together on the substrate 21, and the potential V2 is applied to them. Moreover, the potential Vm is applied to the hinge 25 and the conductive section 29 of the mirror section 27. The potentials V1, V2, and Vm are supplied and controlled by the semiconductor integrated circuit (e.g., the CMOS circuit 37) formed on the substrate 21.

Here, a potential difference between Vm and V1 is taken as V(1) and a potential difference between Vm and V2 is taken as V(2).

When V(1)=V(2)=0 stands, external force developing in the mirror section 27 is zero, and hence the element maintains the shape assumed upon being formed. The mirror section 27 comes to a substantially center position between the upper and lower electrodes. This state is stable, by virtue of elasticity of the hinge 25.

When V(1)=V(2)≠0 stands, the electrostatic force developing in the mirror section 27 becomes symmetrical with respect to the vertical direction. The state achieved when the element has been formed is maintained, and the mirror section 27 comes to a substantially center position between the upper and lower electrodes.

When at least one of V(1) and V(2) is not zero and when V(1) and V(2) are not equal, the electrostatic force developing in the mirror section 27 becomes asymmetrical with respect to the vertical direction, whereupon the mirror section 27 is displaced in the direction of greater electrostatic force. For instance, as shown in FIG. 16, when V(1)>V(2) stands, the electrostatic force generated by the first lower electrode 43a and the second lower electrode 43b is greater than the electrostatic force generated by the first upper electrode 45a and the second upper electrode 45b, whereby the mirror section 27 is displaced downward. Conversely, as shown in FIG. 17, when V(1)<V(2) stands, the electrostatic force F generated by the first upper electrode 45a and the second upper electrode 45b becomes greater than the electrostatic generated by the first lower electrode 43a and the second lower electrode 43b, whereby the mirror section 27 is displaced upward.

When V(1) and V(2) are sufficiently large, the mirror section 27 can be vertically displaced in an arbitrary direction from the center position even if a difference between V(1) and V(2) is small. When potentials to be controlled are taken as, e.g., V1 and V2, only a small potential difference exists between them. Hence, the voltage of the control circuit can be reduced, thereby attaining superiority in terms of cost and integrity.

A notable characteristic of the present invention is that the hinge 25, which is the movable member 73, and the mirror section 27 can be stably displaced and positioned in a non-contacting manner with respect to the optical member. For instance, as shown in FIG. 16, when the absolute value of V(1) is sufficiently large under the assumption that V(1)>V(2), the electrostatic force becomes maximum at the position where the end face (side surface) of the mirror section 27 and the end face (side surface) of the first lower electrode 43a approach most closely to each other and the position where the end face (side surface) of the mirror section 27 and the end face (side surface) of the second lower electrode 43b approach most closely to each other. At this time, displacement of the hinge 25 and that of the mirror section 27 are stopped stably in a non-contacting manner.

Accordingly, the displacement of the movable member 73 is stably determined by means of a structural position of the hinge 25, a structural position of the mirror section 27, and structural positions of the respective electrodes, and highly accurate control of vertical displacement of the mirror section 27 becomes feasible. Moreover, since the movable member 73 is in a non-contacting state, a problem of sticking does not arise, and hence highly reliable, high-speed control becomes possible.

By means of such highly accurate, high-speed, and highly reliable mirror displacement control, the spatial light modulator 300 enables realization of a spatial light modulator which utilizes phase control requiring high positional precision, such as interference and diffraction. For instance, in this configuration, light is caused to enter the mirror section 27. First, a sufficient voltage is applied to V(1) under the requirement of V(1)>V(2), to thus displace the mirror section 27 to the position of the lower electrodes 43. The position of the mirror achieved at this time is taken as a first mirror position. Conversely, in another case a sufficient voltage is applied to V(2) under the requirement of V(1)<V(2), to thus displace the mirror section 27 to the position of the upper electrodes 45. The position of the mirror achieved at this time is taken as a second mirror position. The optical length between the first mirror position and the second mirror position is structurally adjusted so as to become ¼λ, whereby light modulation having the maximum contrast can be performed by means of interference and diffraction.

As mentioned above, potentials are supplied as the electrodes V1, V2, and Vm, as required, whereby the mirror section 27 can be displaced to an arbitrary position, such as an upper position, a lower position, and the center position, by means of the electrostatic forces developing in the respective electrodes and the elasticity of the hinge 25. The driving method employed at this time may be any one selected from an analog control operation (control operation for effecting arbitrary displacement) and a digital control operation (control operation for effecting, e.g., binary displacement).

The electrode wiring and the method for displacing the mirror section 27 by means of controlling the potentials are provided as an illustration, and the present-invention is not limited to this embodiment.

The spatial light modulator 300 can be manufactured in substantially the same manner as is the spatial light modulator 100, and hence repeated explanations thereof are omitted.

Accordingly, according to the spatial light modulator 300, the movable member 73 is constituted of the hinge 25 which has the mirror section 27 and the conductive section 29 and is vertically displaceable. As a result, the mass of the entire movable section is reduced, and moment of inertia is also decreased, to thus enable high-speed operation at a low voltage.

A voltage is applied to the conductive section 29 of the movable member 73 and to the fixed electrode 33 disposed outside the range of the vertical displacement path of the movable member 73, whereby the movable member 73 and the fixed electrode 33 do not come into contact with each other. As a result, the mirror section 27 becomes vertically displaceable in a non-contacting manner and is prevented from affixing to the fixed electrode 33, thereby improving the reliability of the element.

As compared with a conventional element having a so-called comb drive structure, the element of the present invention has a simpler structure, thereby facilitating miniaturization of the element and realization of a one-dimensional array and a two-dimensional array. In addition to these advantages, the footprint of the drive structure is also reduced (i.e., light is prevented from being blocked by the area where the drive structure is formed), and hence an improvement in utilization factor of the light and easy achievement of a high resolution are attained.

Modifications of the third embodiment will now be described.

[First Modification of the Third Embodiment]

Figure 18:
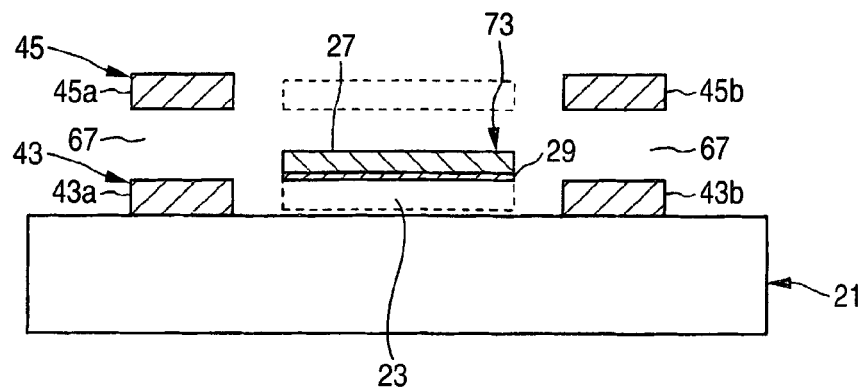
FIG. 18 is a cross-sectional view of a first modification of the third embodiment taken along line E—E, in which a void is provided between the upper and lower electrodes.

FIG. 18 is a cross-sectional view of a first modification of the third embodiment taken along line E—E, in which a void is provided between the upper and lower electrodes.

The insulation layer 49 provided between the lower electrodes 43 and the upper electrodes 45 may be omitted from the spatial light modulator 300, to thus form the void 67. In this case, the upper electrodes 45 are supported and fixed by the support sections 53 formed at both ends in the direction in which the upper electrodes 45 extend (i.e., the direction perpendicular to the paper plane of FIG. 18).

According to the first modification, the amount of static electricity developing between the electrodes is diminished, thereby enabling an improvement in power efficiency and high-speed operation attributable to a decrease in electrical delay.

[Second Modification of the Third Embodiment]

Figure 19:
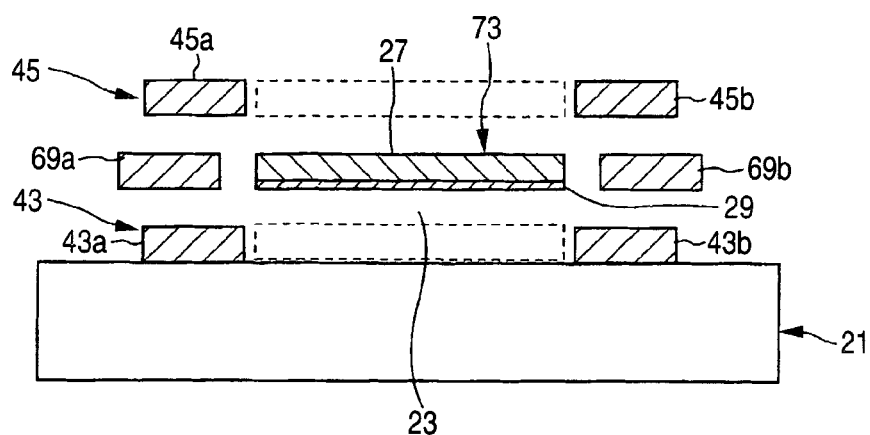
FIG. 19 is a cross-sectional view of a second modification of the third embodiment taken along line E—E, in which an intermediate electrode is provided between the upper and lower electrodes.

FIG. 19 is a cross-sectional view of a second modification of the third embodiment taken along line E—E, in which an intermediate electrode is provided between the upper and lower electrodes.

In the spatial light modulator 300, no limitations are imposed on the number of control electrodes. For instance, as shown in FIG. 19, intermediate electrodes 69a, 69b may also be provided between the lower electrodes 43 and the upper electrodes 45, and the electrodes may be connected together, as required, and controlled.

According to such a second modification, the number of positions at which electrostatic force is to be afforded to the movable member 73 is increased, thereby enabling more accurate, stable control of the movable member 73.

[Third Modification of the Third Embodiment]

Figure 20:
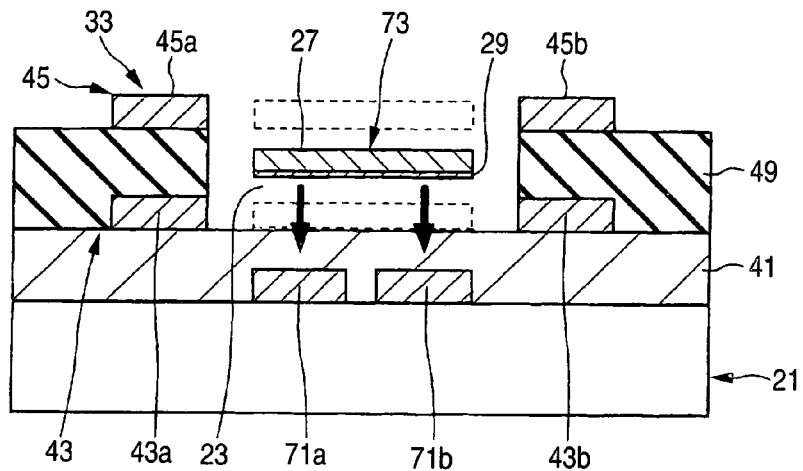
FIG. 20 is a cross-sectional view of a third modification of the third embodiment taken along line E—E, in which auxiliary electrodes are provided between the first and second lower electrodes.

FIG. 20 is a cross-sectional view of a third modification of the third embodiment taken along line E—E, in which auxiliary electrodes are provided between the first and second lower electrodes.

As shown in FIG. 20, the spatial light modulator 300 may be provided with the auxiliary electrodes 71a, 71b. According to the configuration of the electrodes set forth, electrostatic force acts only on end faces (or side surfaces) of the electrodes. Hence, when the hinge 25 and the mirror section 27 are spaced far apart from the end face of the electrodes (i.e., when the deflection angle is large), electrostatic force developing in an initial phase becomes smaller. For this reason, a drive voltage required to generate the electrostatic force is increased, and a response time also becomes longer.

In contrast, according to the third modification, the auxiliary electrodes 71a, 71b are provided below the hinge 25 and the mirror section 27, to thus increase the area of electrodes opposing the hinge 25 and the mirror section 27, to thereby shorten a distance (a void). Electrostatic attractive force is generated in an initial phase of application of a drive voltage by means of primarily the auxiliary electrodes 71a, 71b. The hinge 25 and the mirror section 27 have been displaced and end faces of the hinge 25 and those of the mirror section 27 have approached the end faces of the upper electrode 45 (or the lower electrode 43), to thus increase electrostatic force. As a result, the hinge 25 and the mirror section 27 are maintained in a non-contact state without coming into contact with the insulation layer 41.

As mentioned above, the hinge 25 and the mirror section 27 can be stably positioned and stopped at predetermined locations without contacting another optical member. Concurrently, high-speed drive can be effected at a low voltage.

A spatial light modulator according to a fourth embodiment of the present invention will now be described.

Figure 21:
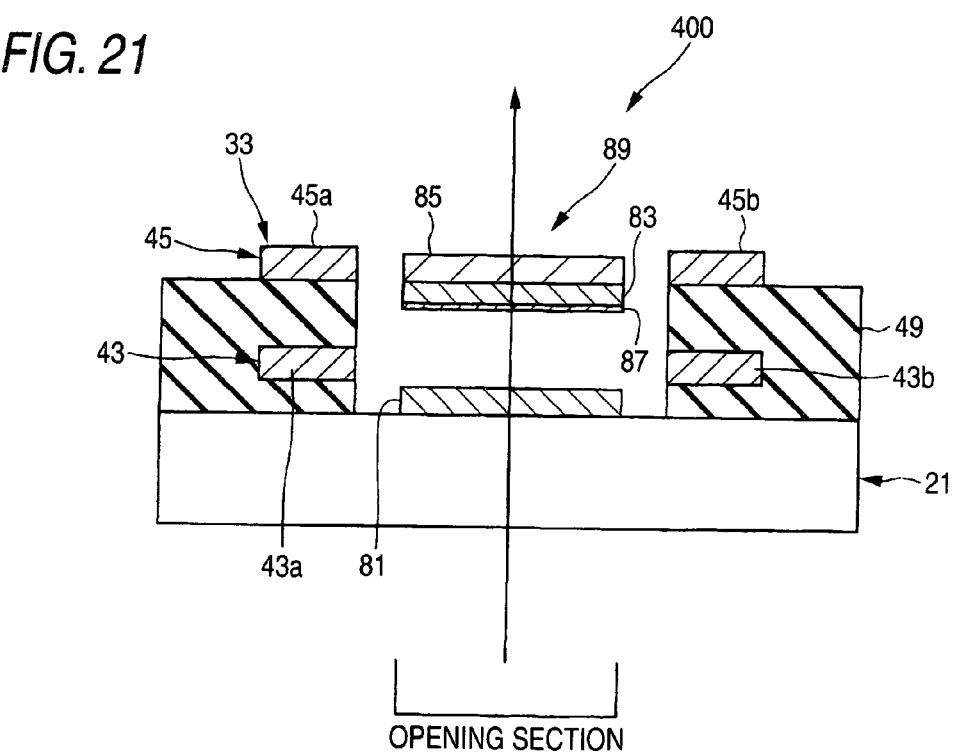
FIG. 21 is a cross-sectional view of a fourth embodiment of a spatial light modulator according to the present invention taken along line E—E.

FIG. 21 is a cross-sectional view of a fourth embodiment of a spatial light modulator according to the present invention taken along line E—E.

A spatial light modulator 400 of the present embodiment has a first half mirror 81 formed on the substrate 21; a movable member 89 having a hinge 83 provided so as to hang across the substrate 21, a second half mirror 85 which can be vertically displaced by means of flexure of the hinge 83, and a conductive section 87 provided in at least a portion of the movable member 89; and the fixed electrode 33 disposed outside the range of vertical displacement path of the movable member 89 induced by the flexure of the hinge 83. The second half mirror 85 is vertically displaced by means of applying a voltage to the conductive section 87 of the movable member 89 and the fixed electrode 33, thereby enabling changing of the length of the optical path of the light between the first halt mirror 81 and the second half mirror 85.

The hinge 83 and the conductive section 87 are formed from a transparent thin film (e.g., an ITO) having conductivity. FIG. 21 separately illustrates the hinge 83, the second half mirror 65, and the conductive section 87. If a semi-transparent material having conductivity is used, the material may be used alone, to thus form the second half mirror 85.

In the spatial light modulator 400, the substrate 21 is provided with the first half mirror 81, and a movable member 89 is provided with the second half mirror 85. A distance between the half mirrors is changed by means of vertical displacement of the movable member 89, thereby changing the intensity of a merged wave stemming from repeated reflection of light between parallel mirrors, whereupon the light emitted from the light source is caused to pass or be reflected.

According to the spatial light modulator 400 having the foregoing configuration, the length of the optical path between the first half mirror 81 provided on the substrate 21 and the second half mirror 85 provided on the movable member 89 is changed as a result of vertical displacement of the hinge 83. Passage and non-passage of the light radiated on the first and second half mirrors 81, 85 can be controlled (i.e., light modulation can be performed) at high speed and a low voltage, by means of interference action of light (e.g., Fabry-Perot interference).

A spatial light modulator array according to a fifth embodiment of the present invention will now be described.

Figure 22:
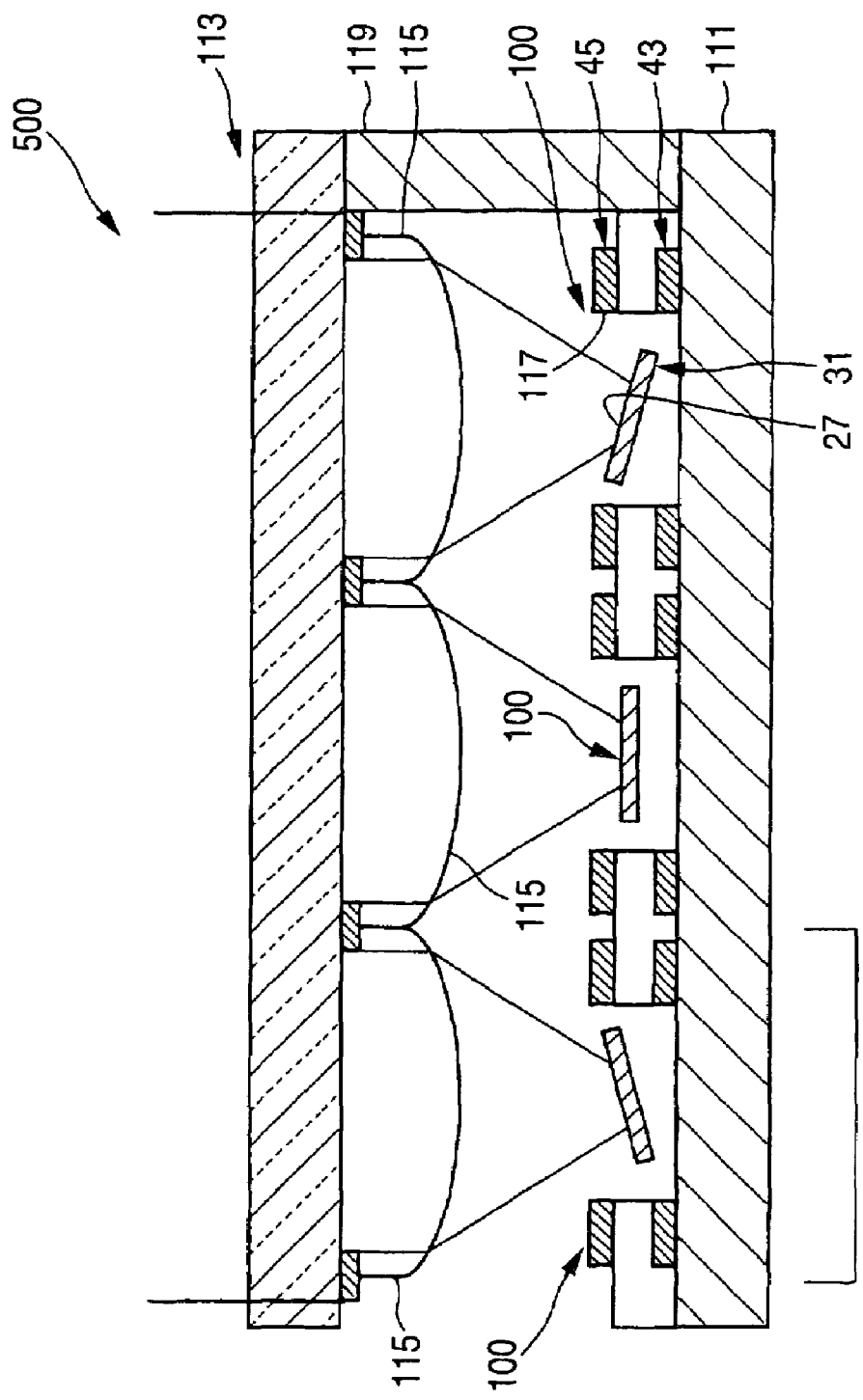
FIG. 22 is a cross-sectional view of the spatial light modulator array of a fifth embodiment, in which an attempt is made to form an array and assemble the array and microlenses into a single element.

FIG. 22 is a cross-sectional view of the spatial light modulator array of the fifth embodiment, in which an attempt is made to form an array and assemble the array and microlenses into a single element.

A plurality of the spatial light modulators 100, the spatial light modulators 200, the spatial light modulators 300, or the spatial light modulators 400 are arranged one-dimensionally or two-dimensionally, to thus enable formation of a spatial light modulator array 500.

For instance, the spatial light modulators 100 of identical structure are arranged one-dimensionally or two-dimensionally on a single array substrate 111, whereby the spatial light modulator array 500 acts as a single light deflection device of reflection type. Accordingly, so long as the spatial light modulators 100 are assembled into an array; e.g., a display device or an exposure device, the plurality of spatial light modulators 100 are arranged homogeneously and highly accurately through semiconductor processing steps. Hence, light rays output from the respective spatial light modulators 100 corresponding to the pixels become easily aligned in terms of intensity, a phase, and a position. Consequently, high resolution and high scanning accuracy can be achieved.

In the spatial light modulator array 500 in which the plurality of spatial light modulators 100 are arranged, the movable element electrodes 59 of the plurality of the spatial light modulators 100, the electrodes being shown in FIG. 4, are commonly connected together. The spatial light modulators 100 are independently driven by a drive voltage applied to the first and second drive electrodes 55, 57 of the respective spatial light modulators 100.

In this spatial light modulator array 500 having such a wiring structure, among the three electrodes of each spatial light modulator 100; that is, the first drive electrode 55, the second drive electrode 57, and the movable element electrode 59, the movable element electrode 59 is connected as common wiring. Each spatial light modulator 100 can be independently driven and controlled by means of the other two drive electrodes; that is, the first drive electrode 55 and the second drive electrode 57. Accordingly, in a spatial light modulator array 500 having "n" spatial light modulators 100, a wiring pattern can be formed with a small number of wiring patterns on the order of (2×n)+1 in contrast with the original number of wires 3×n.

A microlens array 113 is integrally provided in an entrance-side free space of the spatial light modulator array 500. Here, the microlens 113 is a lens array extending in at least a one-dimensional pattern. For instance, planoconvex microlenses (microlenses) 115, each having a substantially rectangular shape, are arranged in a matrix pattern in a one-dimensional or two-dimensional pattern.

The microlens array 113 is formed from a transparent body and gathers the light entering the surface of the plate at right angles by means of diffraction effected at the diffraction end face of the microlens 115. The microlens array 113 is arranged so as to oppose the substrate 111 by way of a support wall 119 such that the light-gathering area coincides with the mirror opening section 17. The microlens array 11 can be formed from glass or plastic by means of a molding method, a pressing method, or a resist transfer method such as photolithography or dry etching.

As mentioned above, in the spatial light modulator array 500 having the microlens array 113, the light gathered by the microlenses 115 is caused to enter the mirror sections 27 of the movable members 31. In the element not having microlenses 115, when the upper electrodes 45 are disposed at the light entrance side of the mirror section 27, the area of the opening through which light enters the spatial light modulators 100 becomes smaller, and the incident light is blocked by the upper electrodes 45 (or the intensity of the light is reduced), thereby decreasing the utilization factor of light. In contrast, so long as the light gathered by the microlenses 115 enters the element, the light can enter the mirror sections 27 without being blocked by the upper electrodes 45 even when the mirror opening sections 117 are small. As a result, the utilization factor of light is increased, and bright deflected light can be obtained with high efficiency even when the opening area is small.

An exposure apparatus according to a sixth embodiment of the present invention will now be described.

Figure 23:
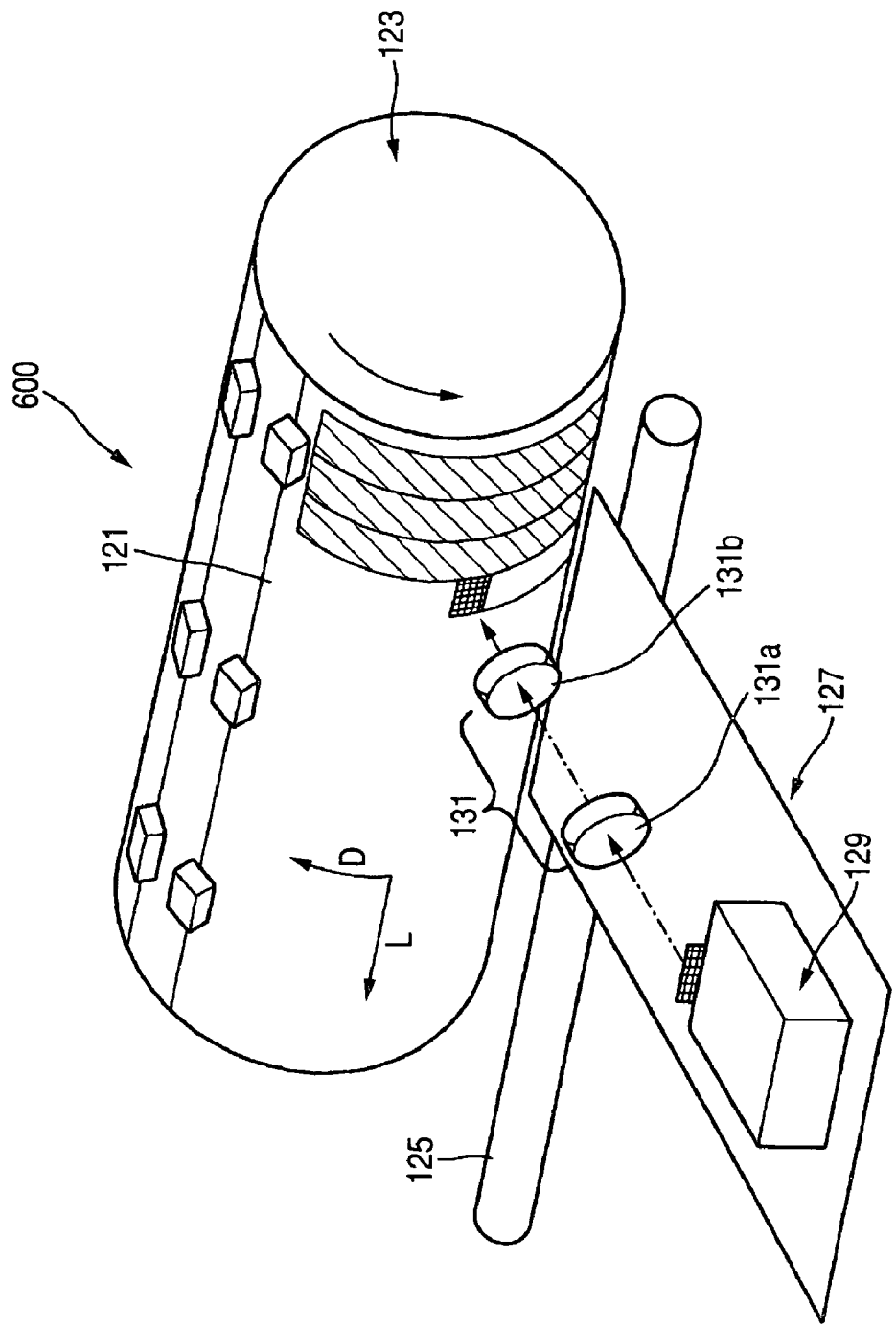
FIG. 23 is a block diagram of the exposure apparatus of a sixth embodiment using the spatial light modulator array.
Figure 24:
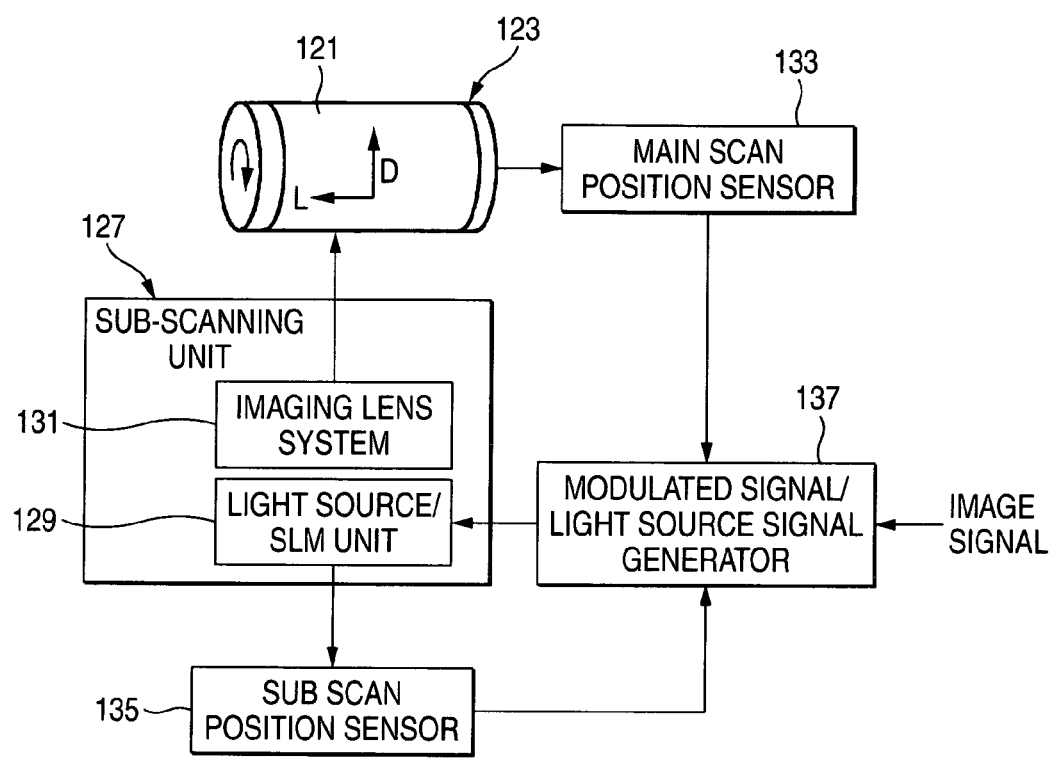
FIG. 24 is a block diagram of the exposure apparatus shown in FIG. 23.
Figure 25:
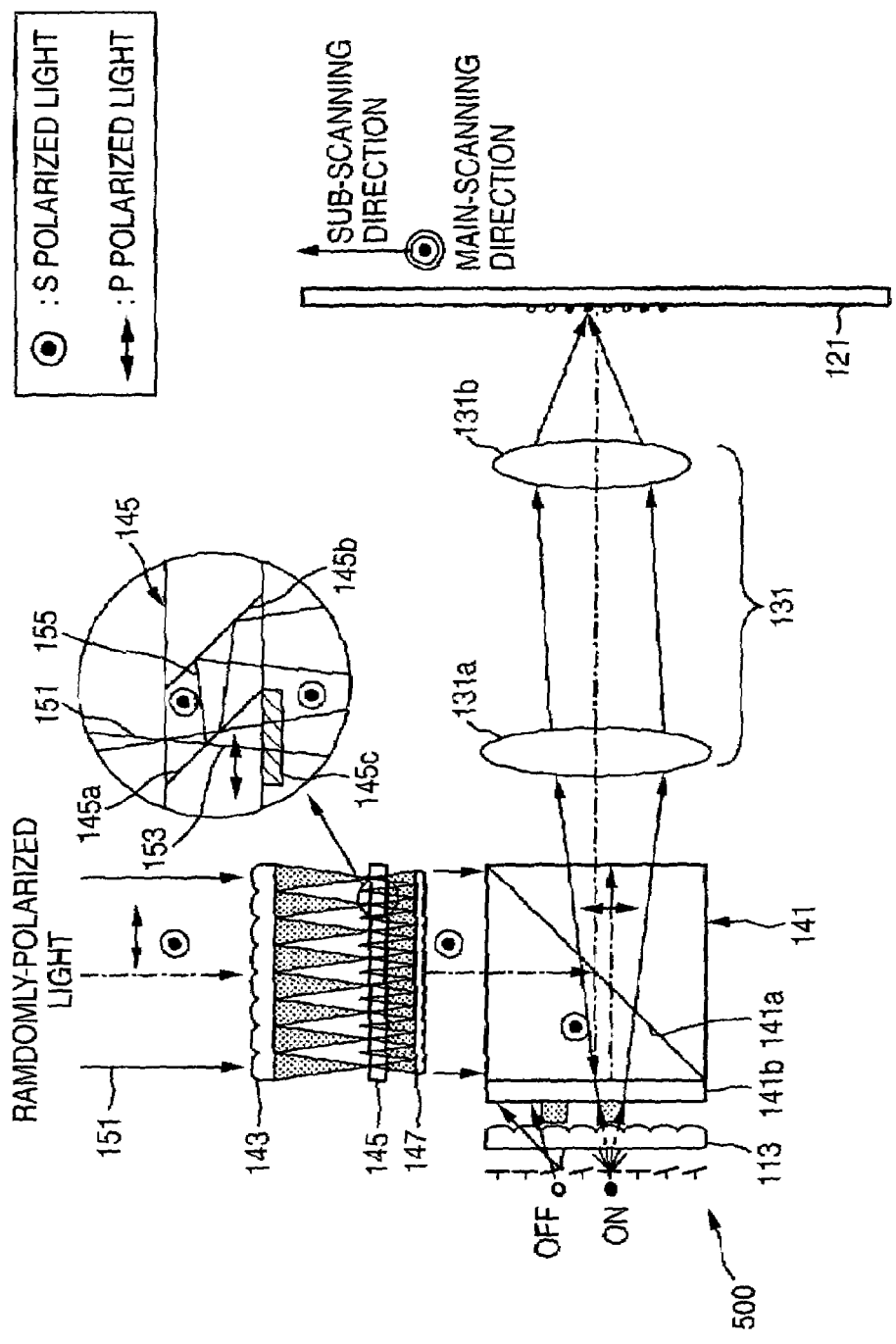
FIG. 25 is a block diagram of an exposure head shown in FIG. 23.
Figure 26:
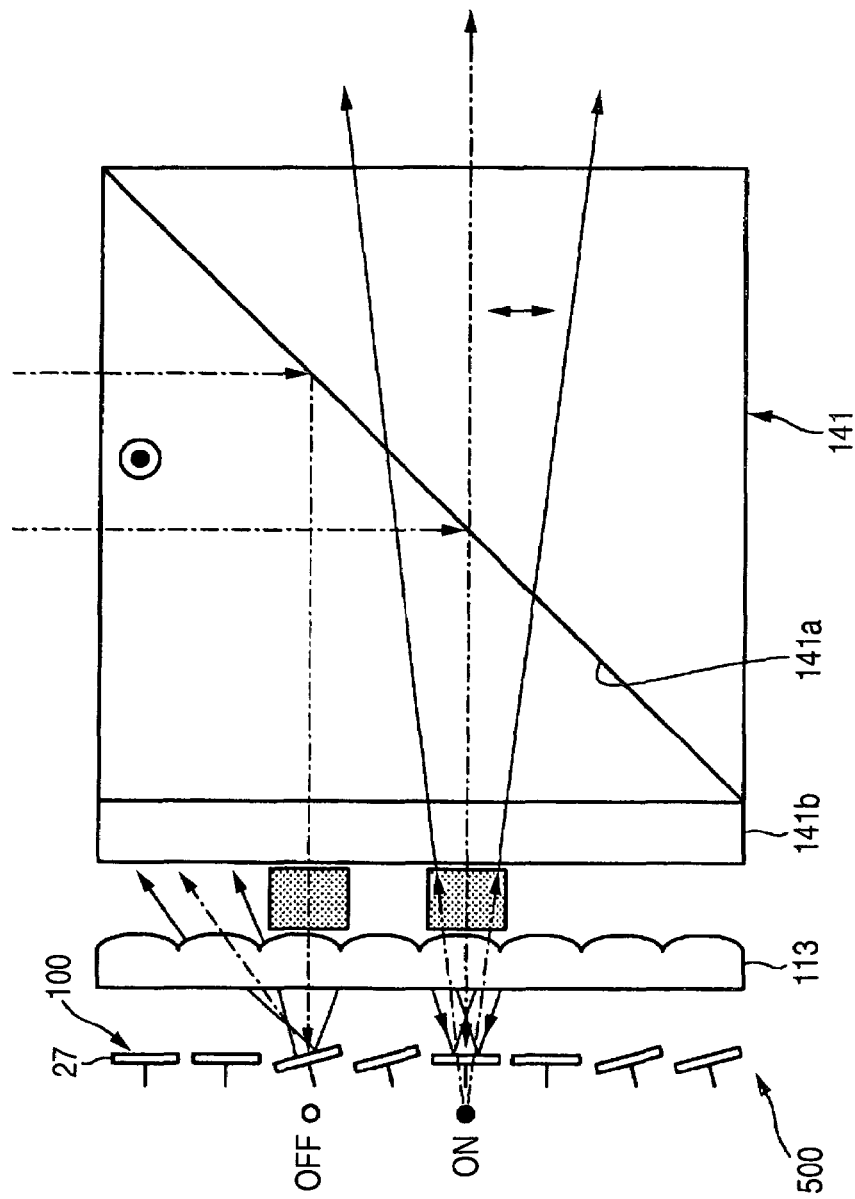
FIG. 26 is an enlarged view of the neighborhood of the spatial light modulator array shown in FIG. 25.

FIG. 23 is a block diagram of the exposure apparatus of the sixth embodiment using the spatial light modulator array; FIG. 24 is a block diagram of the exposure apparatus shown in FIG. 23; FIG. 25 is a block diagram of an exposure head shown in FIG. 23; and FIG. 26 is an enlarged view of the neighborhood of the spatial light modulator array shown in FIG. 25.

The spatial light modulator array 500 can be suitably used for, e.g., an exposure apparatus 600.

As shown in FIG. 23, the exposure apparatus 600 comprises, as a basic configuration, a drum 123 which retains an object for exposure 121 while adsorbing the object 121 on an outer peripheral surface thereof; and a sub-scanning unit 127 which is movably supported by a guide shaft 125 extending along the rotational axis of the drum 123. The drum 123 is rotated counterclockwise in FIG. 23 by means of an unillustrated rotary drive motor. The sub-scanning unit 127 is horizontally moved in FIG. 23 by means of an unillustrated horizontal drive motor. Here, in relation to the object 121, a direction D defined by rotation of the drum 123 becomes a main scanning direction, and a direction L defined by movement of the sub-scanning unit 127 becomes a sub-scanning direction.

As shown in FIG. 24, the sub-scanning unit 127 has a light source/SLM unit 129 and an imaging lens system 131. The rotational position of the drum 123 is detected by a main scan position sensor 133, and the traveled position of the sub-scanning unit 127 is detected by a sub-scan position sensor 135. Positional signals detected by the main scan position sensor 133 and the sub-scan position sensor 135 are input to a signal generator 137. On the basis of the positional signals, the signal generator 137 outputs a modulated signal and a light source signal to the light source/SLM unit 129 in accordance with an image signal sent from a higher-level control section. The imaging lens system 131 is constituted of combined zoom lenses 131*a*, 131*b* which form an image on the surface of the object 121 through use of the laser beam modulated and emitted by the light source/SLM unit 129 by changing a magnifying factor.

In the spatial light modulator array 500, the light source/SLM unit 129 has the plurality of spatial light modulators 100 arranged in the sub-scanning direction. Therefore, when the object 121 and the sub-scanning unit 127 are relatively moved in a direction crossing, at right angles, the direction of arrangement of the spatial light modulators 100 (i.e., the main scanning direction), an area of the object 121 corresponding to one line can be exposed in the same direction as the main scanning direction.

In conjunction with movement of the object 121 in the main scanning direction, an image signal corresponding to one line is delivered to the spatial light modulator array 500 as a modulated signal and a light source signal, whereby the respective spatial light modulators 100 are subjected to activation/deactivation control operation. As a result, the object 121 is exposed in the main scanning direction in the unit of pixels equal in number to the spatial light modulators 100 and then subjected to scanning exposure for one line. Subsequently, the sub-scanning unit 127 is moved in the sub-scanning direction, and in the same manner the object is sequentially exposed by the amount corresponding to one line.

As shown in FIG. 25, the light source/SLM unit 129 has a polarized beam splitter 141 which is a polarization element for polarizing and merging the light emitted from the light source and the light emitted from spatial light modulator array 500. Disposed in the optical path extending from the light source to the polarized beam splitter 141 are, in sequence from the light source, a first lens array plate 143, a polarized light conversion element 145 for converting all the beams emitted from the light source into P polarized beams, and a second lens array plate 147 for converting the light polarized by the polarized light conversion element 145 into collimated luminous flux. The spatial light modulator array 500 equipped with the microlens array 113 is disposed while opposing an adjacent surface crossing, at right angles, the surface of the polarized beam splitter 141 which the light emitted from the light source enters.

Specifically, the light source/SLM unit 129 is configured such that the light emitted from the light source enters the spatial light modulator array 500 by way of the polarized beam splitter 141 and the microlens array 113; such that the light reflected from the spatial light modulator array 500 again enters the polarized beam splitter 141 by way of the microlens array 113; and such that the thus-entered light passes through the polarized beam splitter 141 and is radiated onto the object 121. The light that has originated from the light source and entered the element is converted into luminous flux formed from only a P polarized beam or an S polarized beam, by means of the polarized light conversion element 145, and the luminous flux exits to the polarized beam splitter 141.

Specifically, the first lens array plate 143 is a lens array extending in at least a one-dimensional pattern. As shown in FIG. 25, the first lens array plate 143 generate saline-shaped or dot-shaped array, in the vicinity of a rear focal plane, from unpolarized light (randomly-polarized light) emitted from the light source. The first lens array plate 143 is constituted, by means of arranging planoconvex microlenses, each having a substantially rectangular profile, in a one-dimensional or two-dimensional matrix pattern.

The polarized light conversion element 145 disposed in the optical path of the light emitted from the light source has a pitch which is substantially equal to the pitch of the line-shaped or dot-shaped array generated in the vicinity of the rear focal plane by the first lens array plate 143; is disposed in the vicinity of the focal plane; and converts into P polarized light all the light beams emitted from the light source. The configuration of a portion of the polarized light conversion element 145 is shown in a circle shown in FIG. 25 in an enlarged manner. The polarized light conversion element 145 is constituted of a polarized light separation surface 145*a* coated with a dielectric multilayer film for separating P polarized light from S polarized light; a total reflection surface 145*b*; and a half wavelength plate 145*c*. A symbol having two arrowheads oriented in opposite directions and a symbol resembling a circle with a dot placed therein denote polarized directions of light. Specifically, the symbol having two arrowheads oriented in opposite directions denotes horizontally-polarized light (i.e., P polarized light), and the symbol resembling a circle with a dot placed therein denotes light polarized in the direction perpendicular to the paper drawing (i.e., S polarized light). In the drawings, solid circles and open circles, which are provided on both sides of the mirror section 27 in the drawing, denote a virtual point light source.

The luminous flux 151 that has passed through the first lens array plate 143 and entered the polarized light conversion element 145 is separated into two linearly-polarized light components which cross each other at right angles, by means of the polarized light separation surface 145*a*. Specifically, of the luminous fluxes, the P polarized light 153 passes through the polarized light separation surface 145*a*, and the S polarized light 155 is reflected from the polarized light separation surface 145*a*. The P polarized light 153 having passed through the polarized light separation surface 145*a* passes through a half wavelength plate 145*c*, is converted into S polarized light, and exits from the polarized light conversion element 145. The S polarized light 155 reflected from the polarized light separation surface 145*a* exits in its present form from the polarized light conversion element 145 after having been reflected from the reflection surface 145*b*. Accordingly, the luminous flux 151 entered the polarized light conversion element 145 is totally converted into the S polarized light, and the S polarized light exits.

The second lens array plate 147 disposed in the optical path for the light originating from the light source has about half the pitch of the polarized light conversion element 145. A front focal plane of the polarized light conversion element 145 is arranged to be essentially in conformance with the rear focal plane of the first lens array plate 143. As a result, the luminous flux exiting from the second lens array plate 137 becomes essentially-collimated light, and the thus-collimated luminous flux enters the polarized light beam splitter 141.

The polarized beam splitter 141 is a polarization element for merging beams while suppressing a loss in the amount of light. The polarized beam splitter 141 merges the light that has been emitted from the light source and converted into the S polarized light by the polarized light conversion element 145 with the light that has exited the polarized beam splitter 141 and is reflected form the spatial light modulator array 500. The polarized beam splitter 141 has a polarized light separation surface 141*a* having an optical characteristic of reflecting the S polarized light emitted from the light source and permitting passage of the light output from the spatial light modulator array 500. Accordingly, as shown in FIG. 26, the S polarized light that has been emitted from the light source and entered the polarized beam splitter 141 is reflected from the polarized light separation surface 141*a* and emitted toward the spatial light modulator array 500.

The incident light reflected by the spatial light modulator array 500 passes through the polarized beam splitter 141 and exits.

A quarter wavelength plate 141b is disposed on the surface of the polarized beam splitter 141 opposing the spatial light modulator array 500. Accordingly, the S polarized light reflected from the polarized light separation surface 141a passes through the quarter wavelength plate 141b and is reflected from the spatial light modulator array 500. The light again passes through the quarter wavelength plate 141b, whereby the polarization angle of the light is converted through 90°. The light then becomes P polarized light and exits from the polarized beam splitter 141.

The thus-optically-modulated P polarized light is radiated on the object 121 by means of the imaging lens system 131. Accordingly, if the object 121 is exposed to the reflected light by way of the imaging lens system 141, to thus record an image, exposure or image recording becomes possible. In addition to a recording medium or the like retained by the drum 123, a screen may be employed as the object 121. In this case, if the spatial light modulator array 500 is driven and controlled in accordance with an image signal so as to project the light reflected to the spatial light modulator array 500 on the screen by way of the projection lens, a projector using the spatial light modulator array of the present invention will be obtained.

According to this exposure apparatus 600, the light exiting from the light source to the polarized beam splitter 141 is converted into a luminous flux formed from only P polarized light or S polarized light by means of the polarized light conversion element 145, and the luminous flux passes through the polarized beam splitter 141 without causing a return light component. Specifically, as a result of the polarized light beams of the reflected light having been aligned by the polarized light conversion element 145, there can be prevented occurrence of a return light component, which would otherwise arise when the reflected light is non-polarized light and travels from the mirror surface (i.e. the polarized light separation surface 141a) of the polarized beam splitter 141 toward the light source. As a result, in the exposure apparatus 600 equipped with a compensation circuit (not shown) which detects a portion of the light exiting from the light source (laser diode) by means of a photodiode by way of the polarized beam splitter 141, the compensation circuit does not detect the return light, Consequently, there can be prevented occurrence of an anomaly in controlling of an output from the laser diode performed by the compensation circuit, which would otherwise be caused when the photodiode receives the return light as an excessive amount of light.

Various modifications of the exposure apparatus 600 of the fourth embodiment will now be described. In the following modifications, those members which are the same as those shown in FIGS. 23 through 26 are assigned the same reference numerals, and their repeated explanations are omitted.

[First Modification]

Figure 27:
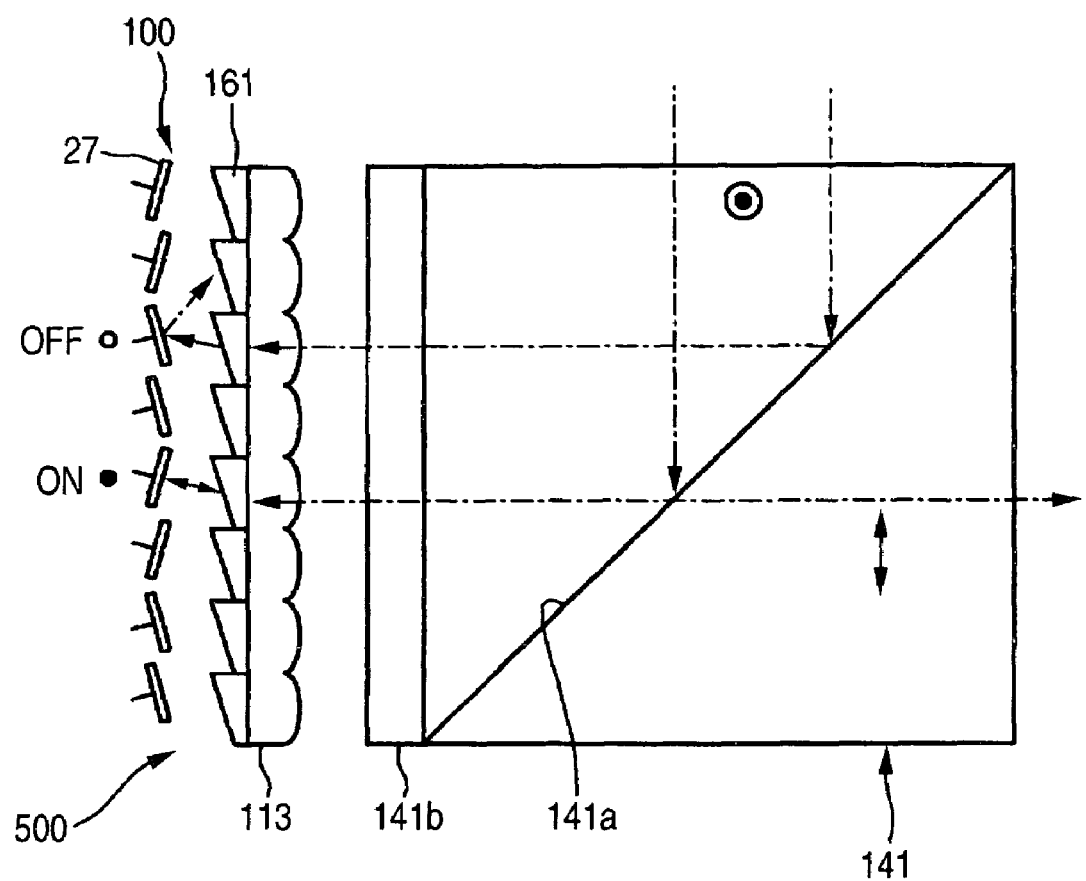
FIG. 27 is an enlarged view of the principal section of the first modification of the sixth embodiment, wherein the microlens array shown in FIG. 26 is provided with a prism.

FIG. 27 is an enlarged view of the principal section of the first modification of the sixth embodiment, wherein the microlens array shown in FIG. 26 is provided with a prism.

In this modification, the microlens array 113 of the spatial light modulator array 500 provided in the light source/SLM unit 129 is provide with a prism 161 which is arranged so as to correspond to the microlenses 115. The light entered the mirror section 27 at this refraction angle is reflected in a direction different from the incident direction when the mirror section 27 is located at an OFF tilt position and reflected in a direction identical with the incident direction when the mirror section 27 is located at an ON tilt position.

Consequently, according to the first modification, when the mirror section 27 and the microlenses 115 are disposed so as to oppose each other, provision of the prism 161 enables reflection of incident light without retaining the mirror section 27 in a horizontal position. Stable extraction of reflected light at both end tilt positions of the mirror section 27; that is, the OFF tilt position and the ON tilt position.

[Second Modification]

Figure 28:
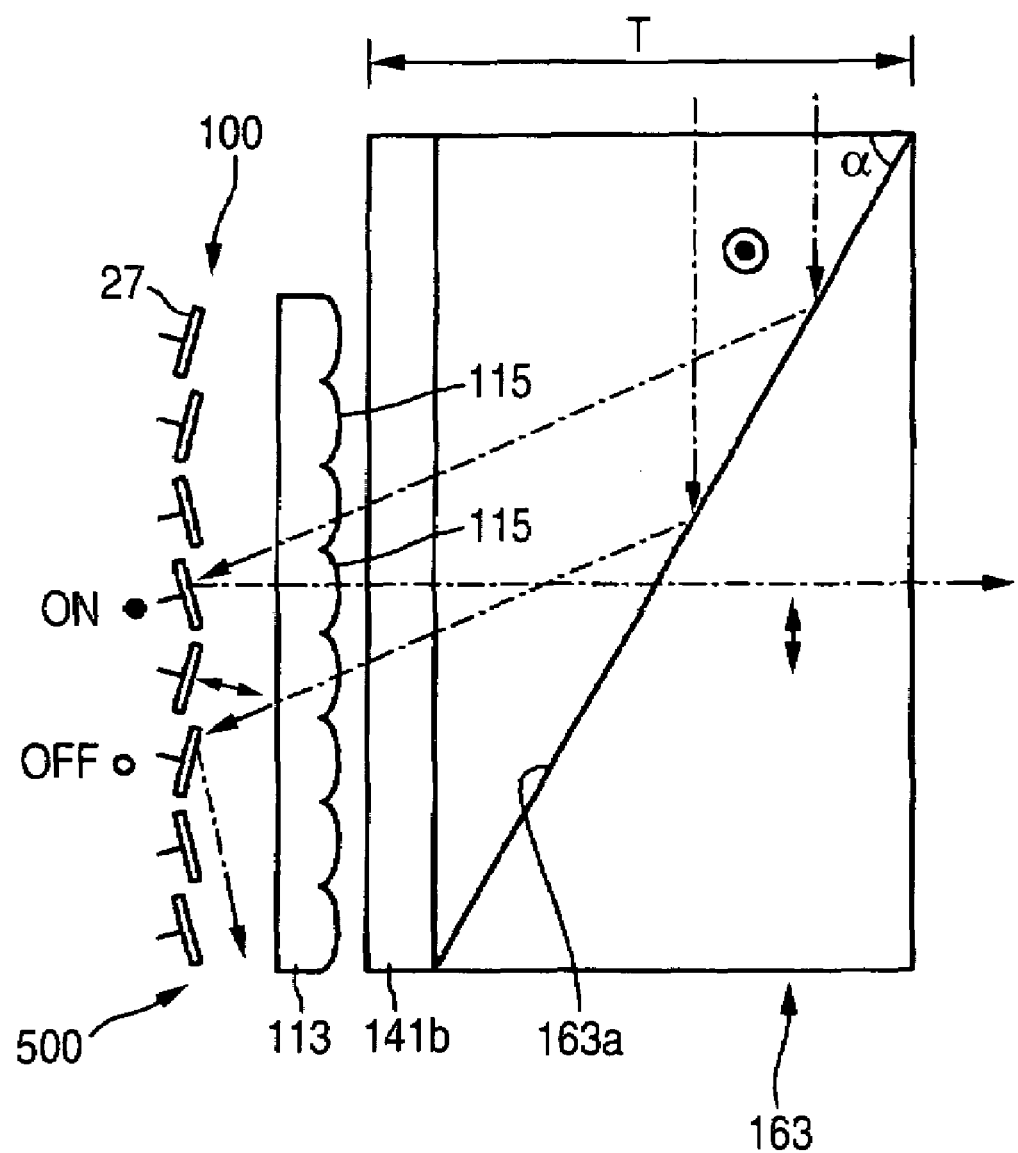
FIG. 28 is an enlarged view of the principal section of a second modification of the sixth embodiment, wherein the light entering the microlens array is tilted.

FIG. 28 is an enlarged view of the principal section of a second modification in which the light entering the microlens array is tilted.

In this modification, a polarized beam splitter 163 has a polarized light separation surface 163a for reflecting the incident light originating from the light source at an angle other than the right angles. The angle α of the polarized light separation surface 163a is arbitrarily set in accordance with the positions of the microlenses 115 and the position of the spatial light modulator 100.

Accordingly, according to the second modification, the angle α of the polarized light separation surface 163a is set to 45° or more, the reflection angle of the polarized light separation surface 163a becomes an obtuse angle, thereby enabling a reduction in the thickness of the polarized beam splitter 163. Since the angle α of the polarized light separation surface 163a is set such that an incident light path and a reflected light path are formed in two adjacent microlenses 115, 115 respectively, stable extraction of reflected light at both end tilt positions of the mirror section 27; that is, the OFF tilt position and the ON tilt position, as in the case of the first modification.

[Third Modification]

Figure 29:
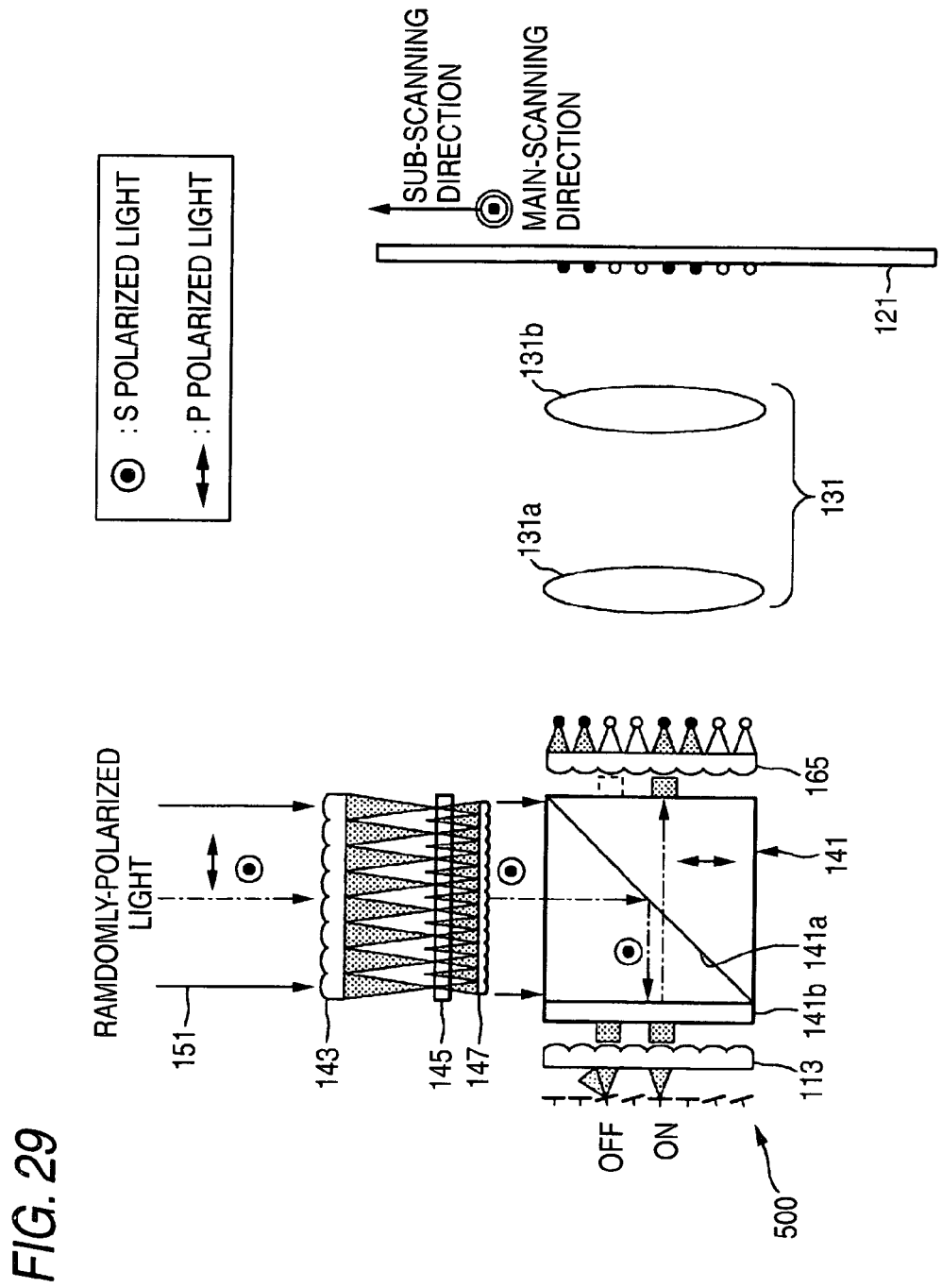
FIG. 29 is a block diagram showing a third modification of the sixth embodiment, wherein the microlens array is disposed on the part of the beam splitter from which light exits.

FIG. 29 is a block diagram showing a third modification in which the microlens-array is disposed on the part of the beam splitter from which light exits.

In this modification, a third lens array plate 165 is provided on the part of the polarized beam splitter 141 from which exposure light exits. The third lens array plate 165 gathers a luminous flux that has been reflected from the mirror section 27 and passed through the polarized beam splitter 141.

Consequently, according to this modification, an object of exposure 121 can be directly exposed to modulated light, and an optical system close to contact exposure can be configured.

[Fourth Modification]

Figure 30:
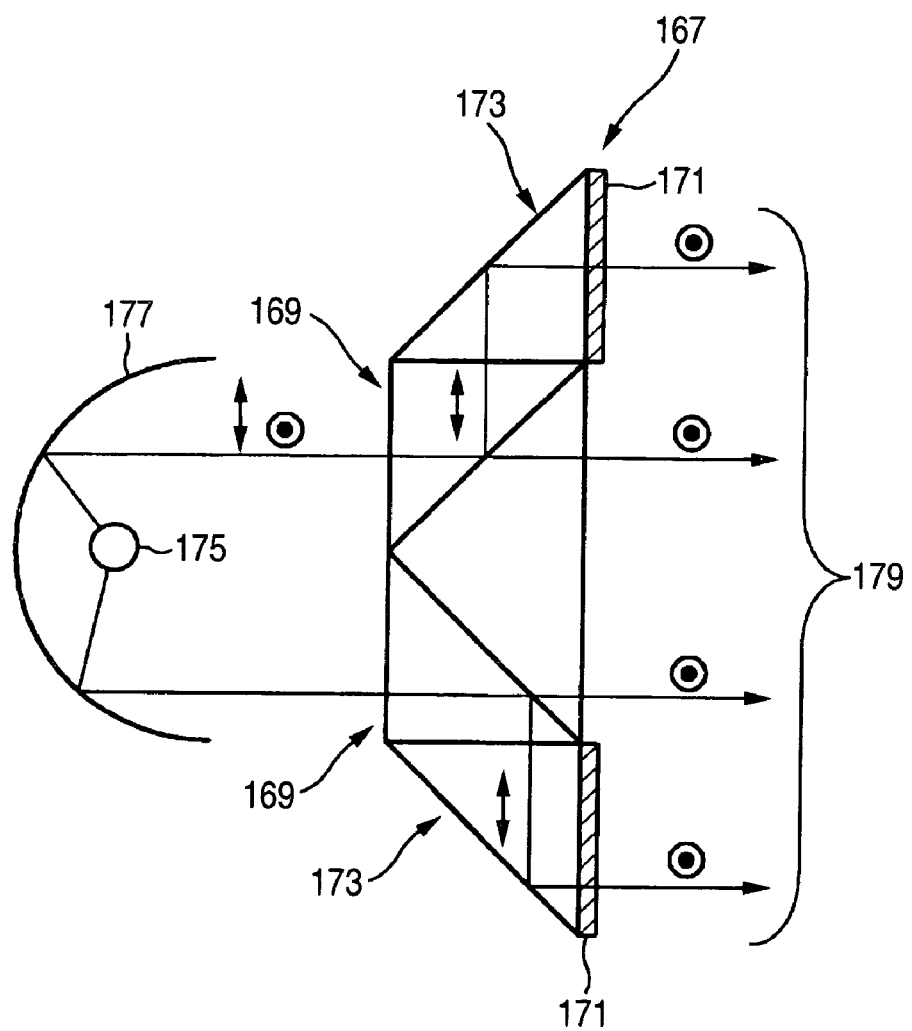
FIG. 30 is a block diagram of a fourth modification of the sixth embodiment, wherein the polarized light conversion element is formed from a pair of beam splitters and a pair of half wavelength plates.

FIG. 30 is a block diagram of a fourth modification in which the polarized light conversion element is formed from a pair of beam splitters and a pair of half wavelength plates.

In this modification, the polarized light conversion element 167 is constituted of a pair of polarized beam splitter 169, 169 and a pair of prisms 173, 173 having a half wavelength plate 171. When randomly-polarized light originating from the light source 175 has entered the polarized beam splitters 169, 169 as a substantially-collimated luminous flux by a reflector (a concave mirror) 177, the S polarized light passes through the polarized beam splitter 169, 169. The optical path of the P polarized light is shifted parallely, and the P polarized light is subjected to phase conversion performed by the half wavelength plate 171, whereupon exit light 179 whose plane of polarization has been totally aligned is obtained.

[Fifth Modification]

Figure 31:
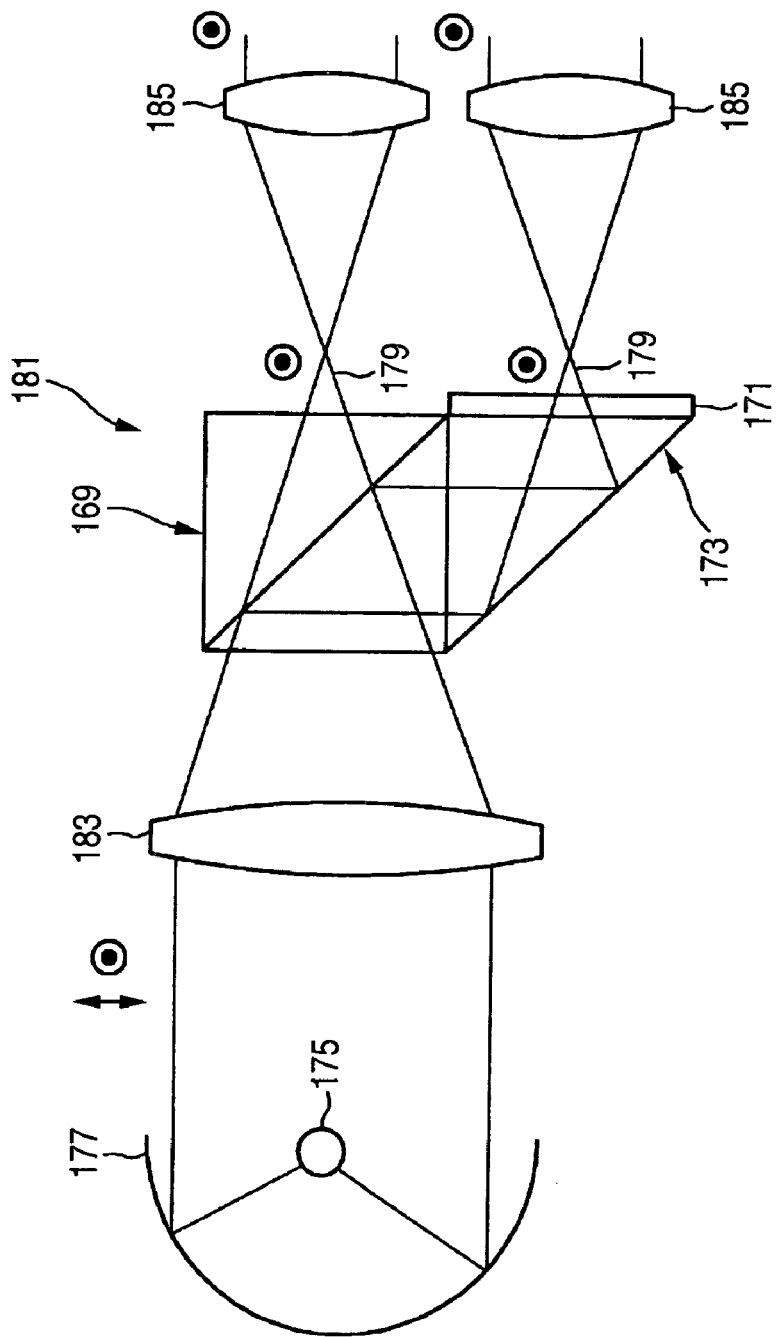
FIG. 31 is a block diagram of a fifth modification of the sixth embodiment, wherein a polarized light conversion element is formed from one beam splitter and one half wavelength plate.

FIG. 31 is a block diagram of a fifth modification in which a polarized light conversion element is formed from one beam splitter and one half wavelength plate.

In this modification, a polarized light conversion element 181 is constituted of the polarized beam splitter 169 and the prism 173 having the half wavelength plate 171. A convex lens 183 is interposed between the reflector 177 with the light source 175 and the polarized beam splitter 169. A convex lens 185 is provided at an exit side of the polarized beam splitter 169, and another convex lens 185 is provided at an exit side of the half wavelength plate 171.

The randomly-polarized light originating from the light source 175 is converted into an essentially-collimated luminous flux by means of the reflector 177. The thus-collimated luminous flux is converged by the convex lens 183 and then enters the polarized light beam splitter 169. Of the thus-entered randomly-polarized light, the S polarized light passes through the polarized beam splitter 169. The optical path of the P polarized light is shifted parallely, and the P polarized light is subjected to phase conversion performed by the half wavelength plate 171, whereupon exit light 179 whose plane of polarization has been totally aligned is produced by the polarized beam splitter 169 and the half wavelength plate 171. After having been converged, the outgoing light is diffused and enters the convex lens 185, where the light becomes collimated light.

Accordingly, according to the fifth modification, the converged light can pass through the polarized light conversion element 181, and the polarized conversion light 181 can be miniaturized.

[Sixth Modification]

Figure 32:
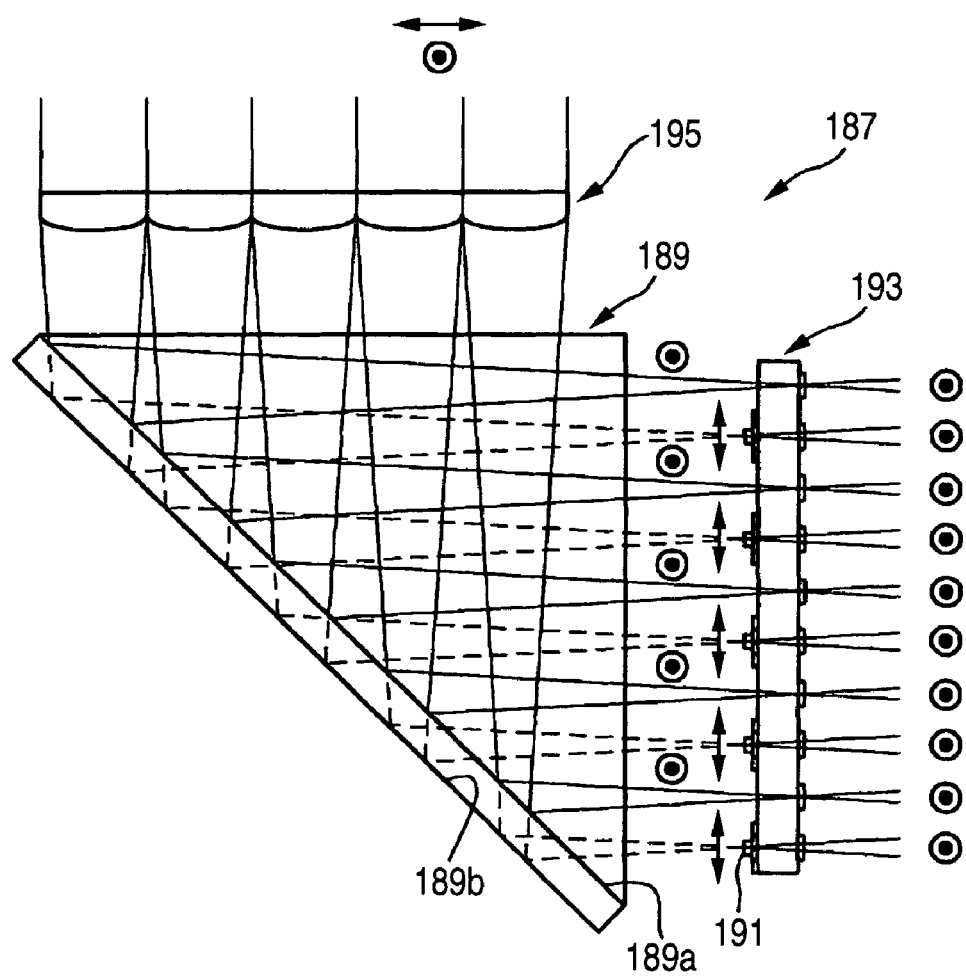
FIG. 32 is a block diagram of a sixth modification of the sixth embodiment, wherein the polarized light conversion element is embodied by use of a polarized light conversion prism.

FIG. 32 is a block diagram of a sixth modification in which the polarized light conversion element is embodied by use of a polarized light conversion prism.

In this modification, a polarized light conversion element 187 comprises a polarized light conversion prism 189, and a phase plate 193 having a plurality of half wavelength plates 191. A lens array plate 195 is provided between an unillustrated light source and the polarized light conversion prism 189. The polarized light conversion prism 189 has two parallel polarized light separation surfaces 189a, 189b. Of the randomly-polarized light entered the polarized light conversion prism 189, the S polarized light is reflected toward and exits from the polarized light separation surface 189a. The P polarized light is reflected toward and exits from the polarized light separation surface 189b. Since the polarized light separation surfaces 189a, 189b are tilted at a predetermined angle with respect to the incident direction, the polarized light beams are alternately separated to exit from the polarized light conversion prism 189.

The half wavelength plates 191 are arranged on the surface of the phase plate 193 opposing the polarized light conversion prism and at a pitch double a pitch at which the polarized beams are separated. In other words, the half wavelength plates 191 are arranged so as to correspond solely to, e.g., the P polarized light.

Consequently, according to the sixth modification, when the randomly-polarized light enters the polarized light conversion prism 189, the incident light is separated into two linearly-polarized light beams having different directions of polarization, by means of the polarized light separation surfaces 189a, 189b. The P polarized light is aligned into the other direction of polarization by means of the half wavelength plates 191, whereupon illumination light of natural light is converted into specific polarized light (the S polarized light in the case of the illustrated modification).

[Seventh Modification]

Figure 33:
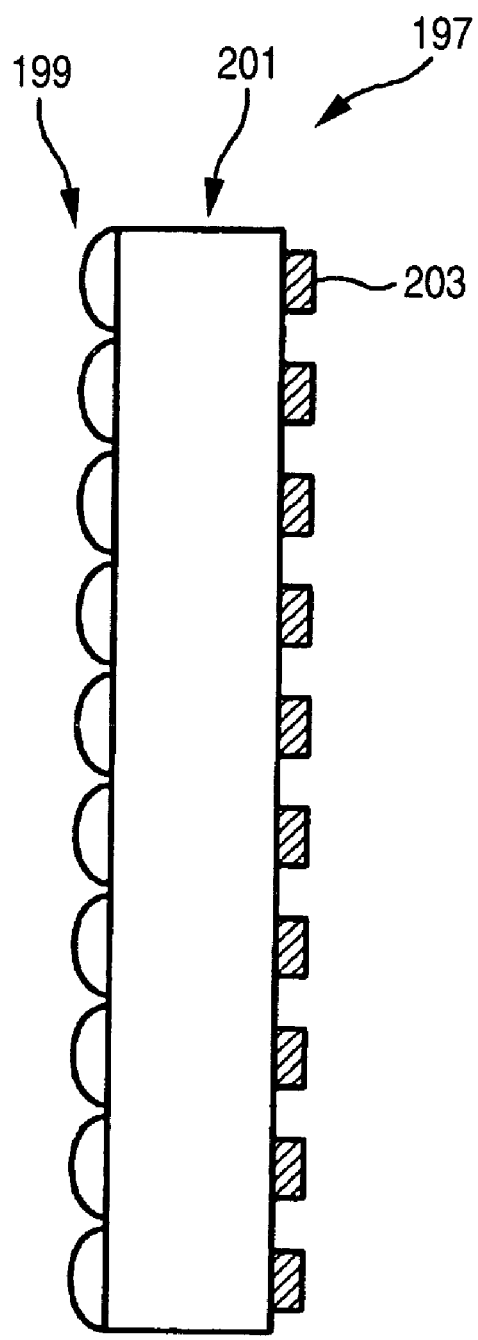
FIG. 33 is a block diagram of a seventh modification of the sixth embodiment, wherein the polarized light conversion element is formed from a birefringent crystal.
Figure 34:
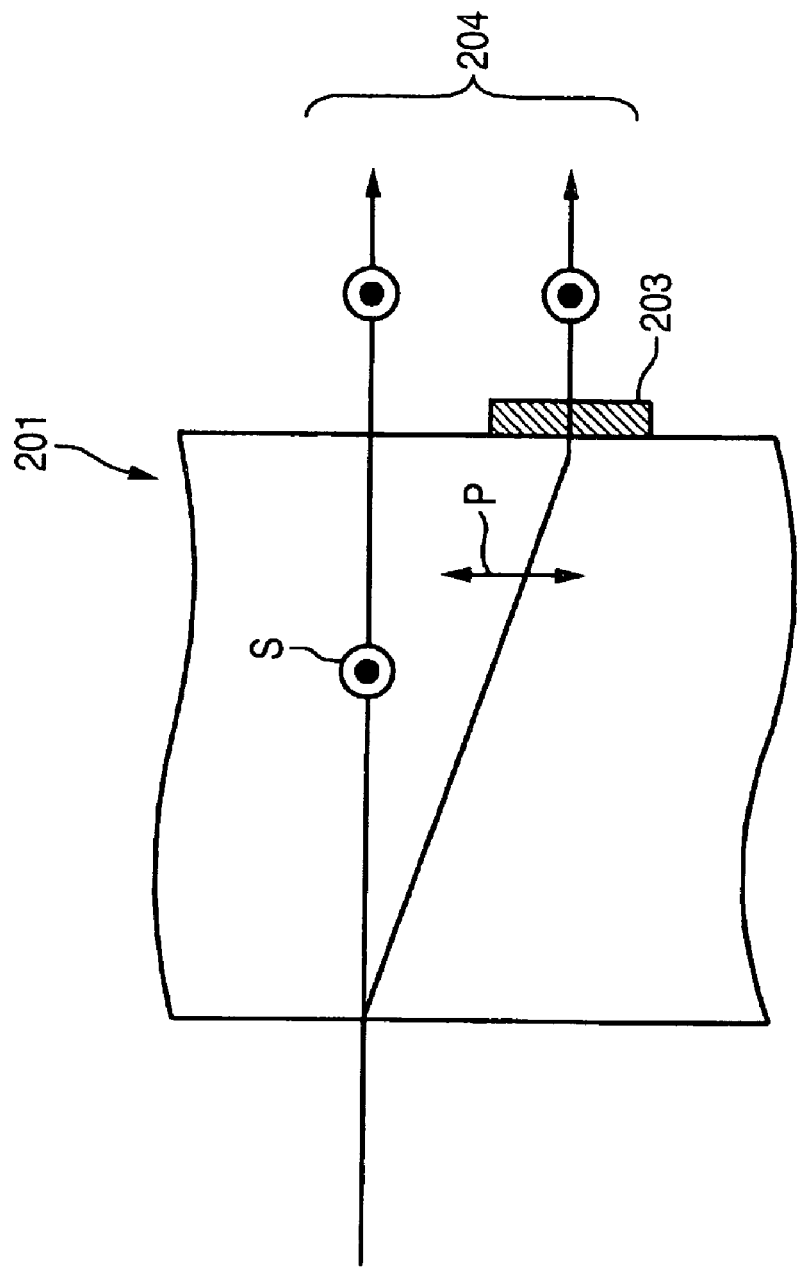
FIG. 34 is a descriptive view for generating linearly-polarized light by means of the polarized light conversion element shown in FIG. 33.

FIG. 33 is a block diagram of a seventh modification in which the polarized light conversion element is formed from a birefringent crystal, and FIG. 34 is a descriptive view for generating linearly-polarized light by means of the polarized light conversion element shown in FIG. 33.

In this modification, a polarized light conversion element 197 comprises a lens array 199 in which condenser lenses are arranged at a given cycle; a birefringent crystal 201 arranged so as to separate ordinary light (e.g., the S polarized light) and extraordinary light (e.g., the P polarized light) in the direction of periodicity of the lens array 199; and a half wavelength plate 203 which is arranged at the same cycle as the lens array 199 and aligns the direction of polarization of the S polarized light and the direction of polarization of the P polarized light, both light beams having been separated by the birefringent crystal 201, in one direction.

Here, calcite is used as the birefringent crystal 201. Light passing through calcite is separated into the S polarized light and the P polarized light. The S polarized light beam and the P polarized light beam are linearly-polarized light beams, and the directions of polarization of these beams cross each other at right angles. As mentioned above, as shown in FIG. 34, the polarization direction of one (P polarized light) of the light beams separated by the birefringent crystal 201 is rotated through 90° by means of the half wavelength plate 203, thereby aligning the directions of polarization of two light beams in one direction. Accordingly, use of the birefringent crystal 201 and the half wavelength plate 203 enables generation of linearly-polarized light 204 from the randomly-polarized light.

However, when the light entering the birefringent crystal 201 is a line, the light can be readily converted into linearly-polarized light, as shown in FIG. 34. When light enters in the form of a flux, the S polarized light and the P polarized light overlap each other even after having passed through the birefringent crystal 201. Hence, only one of the light bears cannot be selectively caused to enter the half wavelength plate 203.

For this reason, the polarized light conversion element 197 is formed by arranging the lens array 199 on the incident surface of the birefringent crystal 201. When the lens array 199 is arranged on the incident surface of the birefringent crystal 201, focal points of the S polarized and P polarized light beams can be formed at respective different locations. As a result, only one of the S polarized light beam and the P polarized light beam can be selectively caused to enter the half wavelength plate 203. Accordingly, the incident light flux of the randomly-polarized light can be converted into linearly-polarized light.

The lens array 199 is arranged at a given period, and the length of one period is preferably about double the width of a space over which the S polarized light and the P polarized light separated from each other after having passed through the birefringent crystal 201. Moreover, the focal distance of the lens array 199 is preferably a distance over which the light to be gathered makes a focus in the vicinity of the half wavelength plate 203 after having passed through the birefringent crystal 201.

The position of the S polarized light beam and the position of the P polarized light beam, both beams having passed through the birefringent crystal 201, can be most clearly separated from each other by satisfying the previously-described requirements. Specifically, only one of the S polarized light beam and the P polarized light beam can be selectively caused to enter the half wavelength plate 203. As a result, the efficiency of conversion of the randomly-polarized light into the linearly-polarized light 204 can be increased.

[Eighth Modification]

Figure 35:
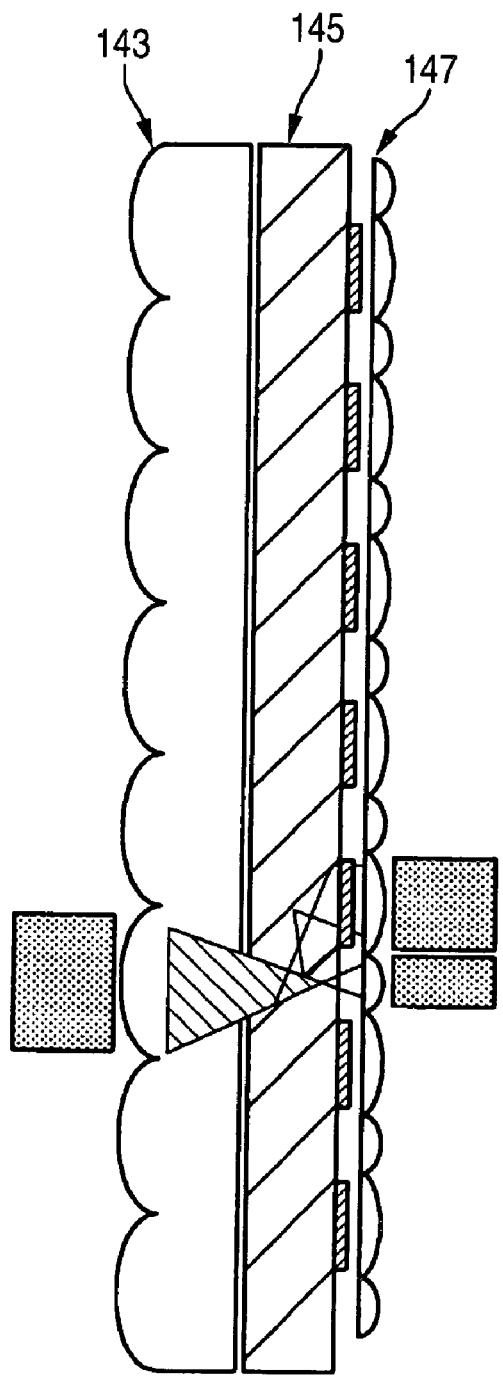
FIG. 35 is a block diagram of an eighth modification of the sixth embodiment, wherein the polarized light element is embodied by integrally providing first and second microlens arrays.

FIG. 35 is a block diagram of an eighth modification in which the polarized light element is embodied by integrally providing first and second microlens arrays.

In this modification, an optical system for converting the light originating from the light source into polarized light and causing the thus-polarized light to enter the polarized beam splitter 141 (the polarized beam splitter 163 or 169 may also be employed) is constituted by integrally assembling the first lens array plate 143, the polarized light conversion element 145, and the second lens array plate 147 by means of, e.g., bonding.

The reason for this is that a merging efficiency is changed by a change in the angle of the luminous flux entering the lens array plates or a change in the relative position between the first and second lens array plates 143, 147 and the polarized light conversion element 145, which is attributable to temperatures or lapse of time. For instance, when the first lens array plate 143 has become out of phase with the polarized light conversion element 145, the P polarized light becomes the S polarized light, and initially-intended merging of two light beams cannot be realized. When the first lens array plate 143 has become out of phase with the second lens array plate 147, the direction in which the light exiting the second lens array plate 147 becomes deviated, which may also obstruct merging of the two light beams. For these reasons, in this modification, occurrence of a change in the merging efficiency is prevented by means of assembling the polarized conversion element 145 in a single element, thereby enabling acquisition of illumination light having a stable amount of light and a stable light quantity distribution.

[Ninth Modification]

Figure 36:
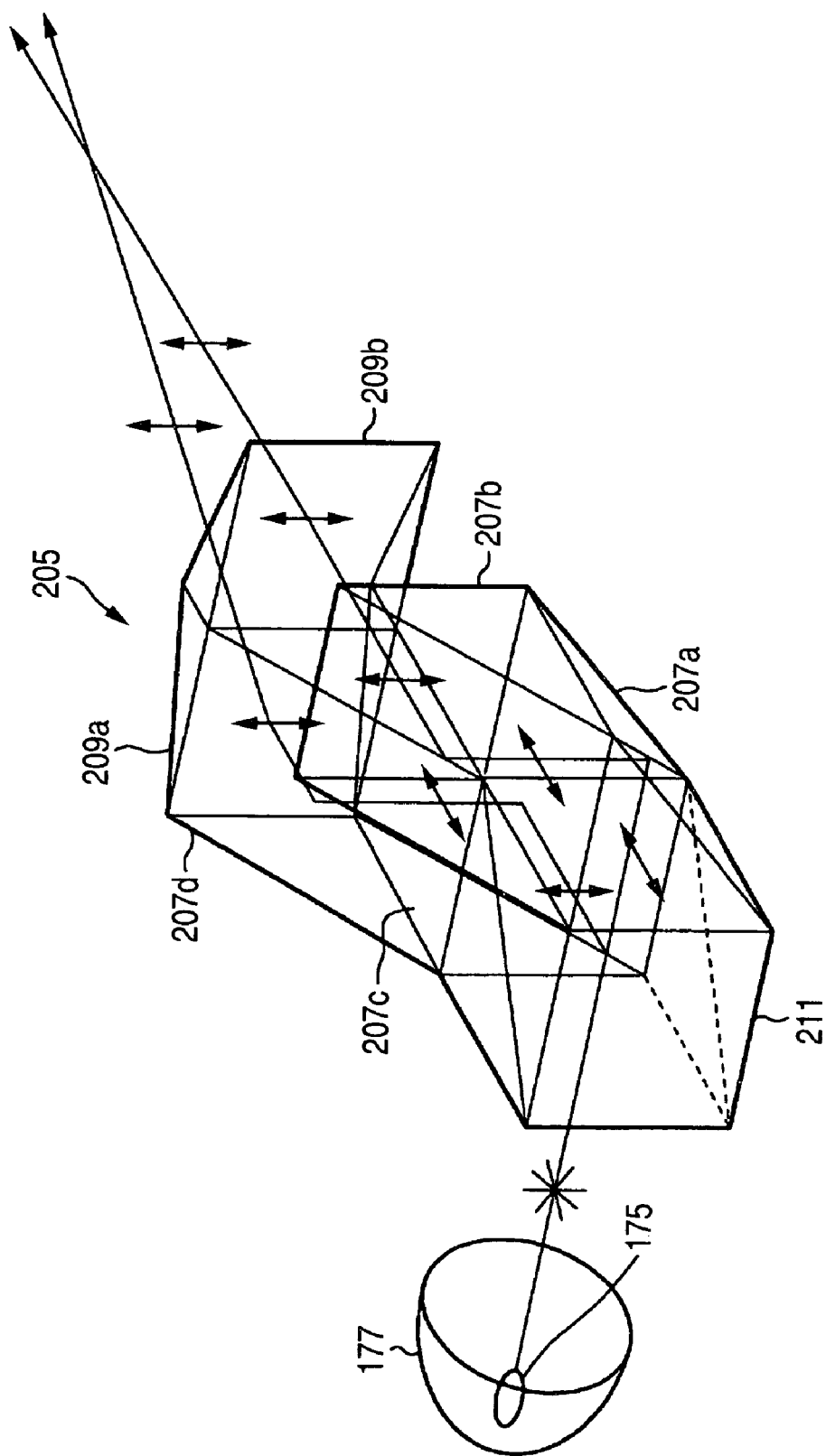
FIG. 36 is a block diagram of a ninth modification of the sixth embodiment, wherein the polarized light conversion element is formed from four rectangular prisms and two merging prisms.
Figure 37:
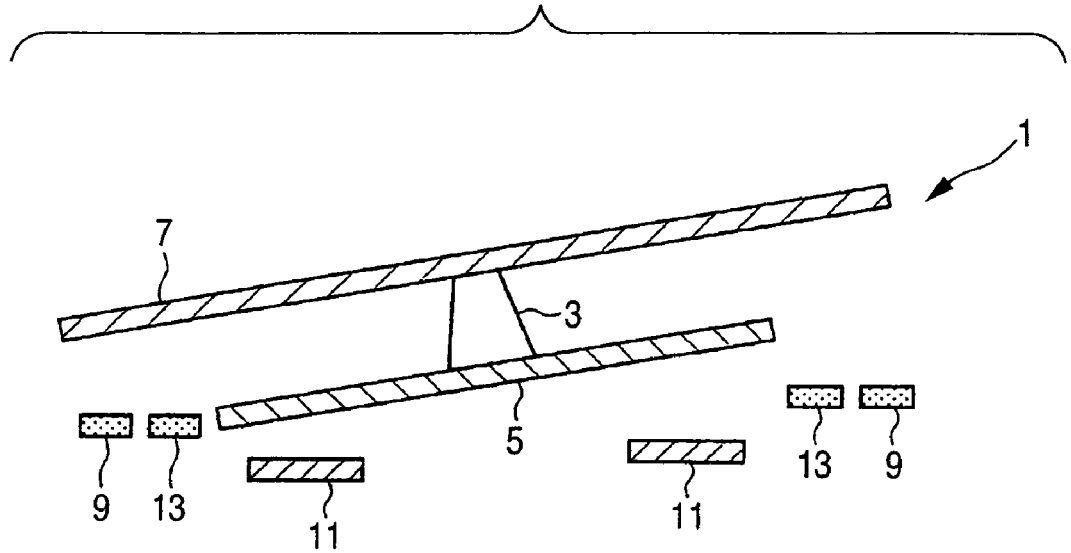
FIG. 37 is a cross-sectional view of a related-art spatial light modulator having a mirror provided on a yoke in a two-layer structure.
Figure 38:
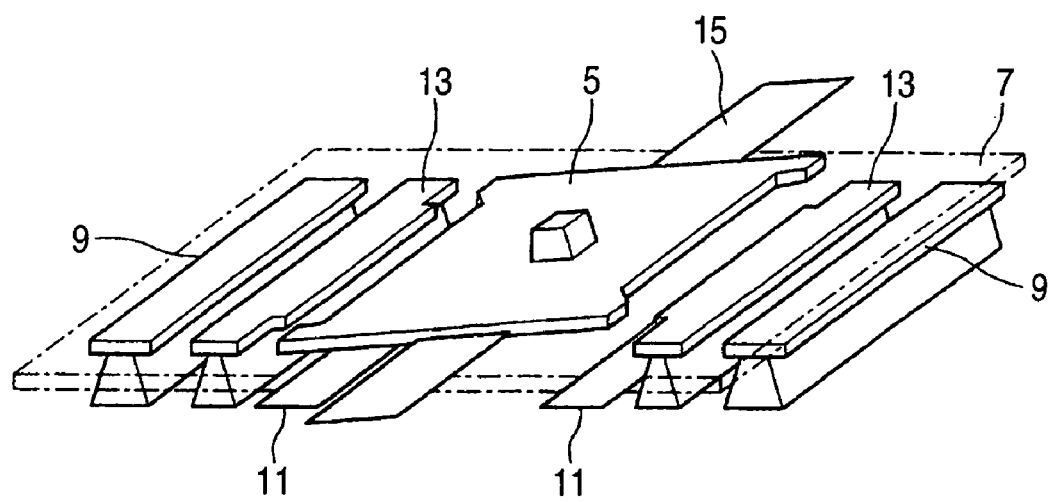
FIG. 38 is a perspective view of the spatial light modulator shown in FIG. 37.

FIG. 36 is a block diagram of a ninth modification, wherein the polarized light conversion element is formed from four rectangular prisms 207a, 207b, 207c, and 207d and two merging prisms 209a, 209b. A rectangular prism is used as the reflection surface in lieu of the mirror.

Natural light emitted from the light source 175 is converted into collimated light by means of the reflector 177. The collimated light is separated, by the polarized beam splitter 211, into two linearly-polarized light beams (i.e., the S polarized light and the P polarized light) whose directions of polarization cross each other at right angles. The direction of polarization of the P polarized light having passed through the polarized beam splitter 211 is rotated through 90° during the course of the P polarized light undergoing total reflection twice on a slope surface of the rectangular prism. The S polarized light reflected from the polarized light separation surface of the polarized beam splitter 211 sequentially enters the rectangular prisms 207c, 207d and undergoes total reflection twice on the slope surface of the rectangular prism. However, the reflection surfaces are arranged in parallel to each other, and hence the direction of polarization remains unchanged. Consequently, the two linearly-polarized light beams separated by the polarized beam splitter 211 have the same direction of polarization, and the directions in which the two linearly-polarized light beams travel become equal to each other. Finally, the two linearly-polarized light beams are merged so as to overlap each other on the spatial light modulator array 300 through use of the merging prisms 209a, 209b.

According the spatial light modulator of the present invention, the movable member is formed from a displaceable beam having an optical function film and a conductive section. The fixed drive electrode is disposed outside a range of rotation within which mechanical displacement of the movable member becomes feasible. As a result, electrostatic attracting force is exerted between the movable member and the fixed drive electrode, by means of applying a drive voltage to the conductive section of the movable member and the fixed drive electrode, and the movable member is actuated and displaced toward the fixed drive electrode in a non-contacting manner and can be brought to a standstill. Thereby, the overall mass of the movable section can be reduced, and high-speed driving at a low voltage can be made possible by means of reducing moment of inertia.

Moreover, a voltage is applied to the conductive section of the movable member and the fixed electrode disposed outside a range of rotation of the movable member. Hence, the optical function film can be displaced in a non-contacting manner, thereby preventing fastening of the movable member to other areas, thereby enhancing the reliability of the element.

In addition, miniaturization of the spatial light modulator and enhancement of a resolution are facilitated, so that a one-dimensional array or a two-dimensional array can be easily realized.

According to the spatial light modulator array of the present invention, spatial light modulators of identical structure are arranged one-dimensionally or two-dimensionally on the same substrate, whereby the spatial light modulators act as a single light deflection device of reflection type. So long as the spatial light modulators are assembled into an array; e.g., a display device or an exposure device, a plurality of spatial light modulators are homogeneously arranged with high accuracy through semiconductor processes. Light rays output from the respective spatial light modulators corresponding to pixels are easily made equal in terms of intensity, a phase, and a position. As a result, a high resolution and a high scanning accuracy can be achieved.

The entire disclosure of each and every foreign patent application from which the benefit of foreign priority has been claimed in the present application is incorporated herein by reference, as if fully set forth.

What is claimed is:

1. A spatial light modulator comprising:
   a substrate;
   a movable member provided above the substrate so as to hang across the substrate in a displaceable manner, wherein at least a portion of the movable member is a conductive section;
   an optical functional film that follows displacement of the movable member, the optical functional film being fixed to the movable member, wherein the optical functional film may be formed integrally with or separately from the movable member; and
   a fixed drive electrode disposed outside a range of rotational path within which mechanical displacement of the movable member becomes feasible, so as to cause displacement and driving of the movable member,
   wherein electrostatic attracting force is exerted between the movable member and the fixed drive electrode by a drive voltage application to at least one of the conductive section of said movable member and the fixed drive electrode, and the movable member is actuated and displaced with respect to the fixed drive electrode while maintaining the movable member in a non-contact state and then brought to a standstill, so as to modulate light radiated on the optical function film, wherein the movable member further comprises a beam, the beam being provided above the substrate so as to hang across the substrate, wherein the optical function film can be rotationally displaced by torsion of the beam; and wherein the fixed drive electrode is disposed outside of a range of rotational path of the movable member defined by the torsion of the beam, and the optical function film is pivotally displaced by the drive voltage application.

2. The spatial light modulator according to claim 1, wherein the fixed drive electrode is disposed on both sides of the beam so that the beam is a center.

3. The spatial light modulator according to claim 1, wherein the fixed drive electrode has a lower electrode disposed closer to the substrate, with reference to a non-drive position of the beam; and an upper electrode disposed further from the substrate, with reference to the non-drive position.

4. The spatial light modulator according to claim 3, wherein the lower electrode comprises a first lower electrode and a second lower electrode, the first and second lower electrodes being provided on respective sides of the beam so that the beam is a center;

the upper electrode comprise a first upper electrode and a second upper electrode, the first and second upper electrodes being provided on respective sides of the beam so that the beam is a center; and the first lower electrode and the second upper electrode are electrically connected together, and the second lower electrode and the first upper electrode are electrically connected together.

5. A spatial light modulator array comprising a plurality of spatial light modulators arranged one-dimensionally or two-dimensionally, each of which being a spatial light modulator according to claim 4, wherein the spatial light modulator array comprises: a plurality of first drive electrodes, each of which including the first lower electrode and the second upper electrode in the spatial light modulator; a plurality of second drive electrodes, each of which including the second lower electrode and the first upper electrode in the spatial light modulator; and a plurality of movable element electrodes, each of which including the conductive section of the movable member in the spatial light modulator, wherein said plurality of movable element electrodes are commonly connected together; and wherein each of said plurality of spatial light modulators is independently driven by a drive voltage applied to at least one of the first and second drive electrodes in each of said plurality of spatial light modulators.

6. The spatial light modulator array according to claim 5, further comprising:

a microlens array having a plurality of microlenses, wherein each of said plurality of microlenses is disposed so as to face the optical functional film of each of said plurality of spatial light modulators arranged one-dimensionally or two-dimensionally.

7. An exposure apparatus comprising:

a spatial light modulator array according to claim 6; and a beam splitter, wherein light originating from a light source enters the spatial light modulator array by way of the beam splitter and the microlens array; and light reflected from the spatial light modulator array again enters the beam splitter by way of the microlens array and is radiated onto an object to be exposed by way of the beam splitter.

8. The spatial light modulator according to claim 1, wherein the optical function film is a mirror section formed separately from the movable member.

9. A spatial light modulator array comprising a plurality of spatial light modulators, each of which being a spatial light modulator according to claim 1, wherein said plurality of spatial light modulators are arranged one-dimensionally or two-dimensionally.

10. The spatial light modulator according to claim 1, wherein the beam creates a void area beneath an entire area of the movable member.

11. The spatial light modulator according to claim 1, wherein the fixed electrode includes a lower electrode disposed close to the substrate and a second electrode disposed above the lower electrode disposed more distally from the substrate.

12. The spatial light modulator according to claim 11 wherein the lower electrode and second electrode are the only electrodes operable to drive the member and to bring the member to a standstill state.

13. A spatial light modulator comprising:

a substrate;

a movable member provided above the substrate so as to hang across the substrate in a displaceable manner, wherein at least a portion of the movable member is a conductive section;

an optical functional film that follows displacement of the movable member, the optical functional film being fixed to the movable member, wherein the optical functional film may be formed integrally with or separately from the movable member; and a fixed drive electrode disposed outside a range of rotational path within which mechanical displacement of the movable member becomes feasible, so as to cause displacement and driving of the movable member, wherein electrostatic attracting force is exerted between the movable member and the fixed drive electrode by a drive voltage application to at least one of the conductive section of said movable member and the fixed drive electrode, and the movable member is actuated and displaced with respect to the fixed drive electrode while maintaining the movable member in a non-contact state and then brought to a standstill, so as to modulate light radiated on the optical function film, and further comprising:

an auxiliary electrode disposed adjacent to the movable member, so as to cause displacement drive force to develop in the movable member by applying a voltage to the auxiliary electrode at an initial driving phase of the movable member.

14. The spatial light modulator according to claim 13, wherein the auxiliary electrode is activated under a same operation as the fixed electrode.

15. The spatial light modulator according to claim 13, further comprising a controller, wherein the controller controls a timing of the voltage applied to the fixed electrode and the auxiliary electrode by a common operation.

16. A spatial light modulator comprising:

a substrate;

a movable member provided above the substrate so as to hang across the substrate in a displaceable manner, wherein at least a portion of the movable member is a conductive section;

an optical functional film that follows displacement of the movable member, the optical functional film being fixed to the movable member, wherein the optical functional film may be formed integrally with or separately from the movable member; and a fixed drive electrode disposed outside a range of rotational path within which mechanical displacement of the movable member becomes feasible, so as to cause displacement and driving of the movable member, wherein electrostatic attracting force is exerted between the movable member and the fixed drive electrode by a drive voltage application to at least one of the conductive section of said movable member and the fixed drive electrode, and the movable member is actuated and displaced with respect to the fixed drive electrode while maintaining the movable member in a non-contact state and then brought to a standstill, so as to modulate light radiated on the optical function film, wherein the movable member further comprises a beam, the beam being provided above the substrate so as to hang across the substrate;

wherein the optical function film can be displaced vertically with reference to the beam by flexure of the beam; and wherein the fixed drive electrode is disposed outside of a range of displacement path of the movable member defined by the flexure of the beam, and the optical function film is vertically displaced by the drive voltage application.

17. The spatial light modulator according to claim 16, wherein the fixed drive electrode is disposed on both sides of the beam so that the beam is a center.

18. The spatial light modulator according to claim 16, wherein the fixed drive electrode has a lower electrode disposed closer to the substrate, with reference to a non-drive position of the beam; and an upper electrode disposed further from the substrate, with reference to the non-drive position.

19. The spatial light modulator according to claim 18, wherein the lower electrode comprises a first lower electrode and a second lower electrode, the first and second lower electrodes being provided on respective sides of the beam so that the beam is a center;

the upper electrode comprise a first upper electrode and a second upper electrode, the first and second upper electrodes being provided on respective sides of the beam so that the beam is a center; and the first lower electrode and the second lower electrode are electrically connected together, and the first upper electrode and the second upper electrode are electrically connected together.

20. A spatial light modulator array comprising a plurality of spatial light modulators arranged one-dimensionally or two-dimensionally, each of which being a spatial light modulator according to claim 19, wherein the spatial light modulator array comprises: a plurality of first drive electrodes, each of which including the first lower electrode and the second lower electrode in the spatial light modulator; a plurality of second drive electrodes, each of which including the first upper electrode and the second upper electrode in the spatial light modulator; and a plurality of movable element electrodes, each of which including the conductive section of the movable member in the spatial light modulator, wherein said plurality of movable element electrodes are commonly connected together; and wherein each of said plurality of spatial light modulators is independently driven by a drive voltage applied to at least one of the first and second drive electrodes in each of said plurality of spatial light modulators.

21. The spatial light modulator array according to claim 20, further comprising:

a microlens array having a plurality of microlenses, wherein each of said plurality of microlenses is disposed so as to face the optical functional film of each of said plurality of spatial light modulators arranged one-dimensionally or two-dimensionally.

22. An exposure apparatus comprising:

a spatial light modulator array according to claim 21; and a beam splitter, wherein light originating from a light source enters the spatial light modulator array by way of the beam splitter and the micro lens array; and light reflected from the spatial light modulator array again enters the beam splitter by way of the microlens array and is radiated onto an object to be exposed by way of the beam splitter.

23. The spatial light modulator according to claim 16, wherein the optical function film is a light reflector which reflects radiated light.

24. The spatial light modulator according to claim 16, further comprising a first half mirror formed on the substrate, wherein the optical function film is a second half mirror.

25. The spatial light modulator according to claim 16, further comprising:

an auxiliary electrode disposed adjacent to the movable member, so as to cause displacement drive force to develop in the movable member by applying a voltage to the auxiliary electrode at an initial driving phase of the movable member.

26. A spatial light modulator array comprising a plurality of spatial light modulators, each of which being a spatial light modulator according to claim 16, wherein said plurality of spatial light modulators are arranged one-dimensionally or two-dimensionally.

* * * * *